US010333807B2

(12) United States Patent
Egner et al.

(10) Patent No.: US 10,333,807 B2
(45) Date of Patent: Jun. 25, 2019

(54) METHOD AND APPARATUS FOR SELECTING AMONG MULTI-PROTOCOL RADIO TECHNOLOGY USING LOCAL QOS ADVERTISEMENT

(71) Applicant: Dell Products, LP, Round Rock, TX (US)

(72) Inventors: Will A. Egner, Cedar Park, TX (US); Liam B. Quinn, Austin, TX (US)

(73) Assignee: Dell Products, LP, Round Rock ( * ) Notice: Subject to any disclaimer, the term of this patent is extended or adjusted under 35 U.S.C. 154(b) by 28 days.

(21) Appl. No.: 15/389,358

(22) Filed: Dec. 22, 2016

(65) Prior Publication Data

US 2018/0184330 A1      Jun. 28, 2018

(51) Int. Cl.
*H04W 28/16* (2009.01)
*H04L 12/26* (2006.01)
(Continued)

(52) U.S. Cl.
CPC ........ *H04L 43/065* (2013.01); *H04L 43/0876* (2013.01); *H04L 43/14* (2013.01);
(Continued)

(58) Field of Classification Search
CPC ......... H04W 28/0231; H04W 28/0236; H04W 28/16; H04W 28/18; H04W 28/24; H04W 36/08; H04W 36/16; H04W 36/18; H04W 36/22; H04W 36/24; H04W 36/30; H04W 40/02; H04W 40/12; H04W 48/06; H04W 48/10; H04W 48/18; H04W 48/20; H04W 72/02; H04W 72/0426; H04W 72/0453
See application file for complete search history.

(56) References Cited

U.S. PATENT DOCUMENTS 7,013,145 B1    3/2006  Centore, III
8,666,048 B2    3/2014  Beerse et al.
(Continued)

OTHER PUBLICATIONS

Non-Final Office Action dated May 6, 2016 in co-pending U.S. Appl. No. 15/065,539, filed Mar. 9, 2016.
(Continued)

*Primary Examiner* — Mohamed A Kamara
(74) *Attorney, Agent, or Firm* — Prol Intellectual Property Law, PLLC; H. Kenneth Prol

(57) ABSTRACT

A system and method including scanning a plurality of radio channels, via a radio scanning modem, in a shared communication frequency band for a plurality of base transceiver station (BTS) systems operating a first wireless link protocol within communication range of a wireless interface for an anchor BTS, detecting a BTS load for each detected BTS systems of the first wireless link protocol operating on each radio channel in a wireless neighborhood, receiving data scanned for the BTS load for detected BTS systems of a second wireless link protocol in the wireless neighborhood, and preparing a radiofrequency band local QoS report for at least one detected BTS system of the first wireless link protocol and at least one detected BTS system of the second wireless link protocol in the shared communication frequency band of the wireless neighborhood for unlicensed broadcast to a user mobile information handling system.

20 Claims, 9 Drawing Sheets

(51) Int. Cl.
*H04W 48/16* (2009.01)
*H04W 88/08* (2009.01)
*H04W 84/12* (2009.01)

(52) U.S. Cl.
CPC ............. *H04W 48/16* (2013.01); *H04L 43/08* (2013.01); *H04L 43/16* (2013.01); *H04W 84/12* (2013.01); *H04W 88/08* (2013.01)

(56) References Cited

U.S. PATENT DOCUMENTS

| | | | | |
|---|---|---|---|---|
| 9,088,859 | B2* | 7/2015 | Egner | ................... H04W 4/003 |
| 9,119,039 | B2 | 8/2015 | Egner | |
| 9,167,591 | B2 | 10/2015 | Egner | |
| 9,210,714 | B2 | 12/2015 | Egner | |
| 9,313,603 | B2 | 4/2016 | Egner | |
| 2002/0025807 | A1* | 2/2002 | Zimmerman | ........ H04B 17/309 455/423 |
| 2004/0185864 | A1* | 9/2004 | Balachandran | ....... H04W 28/22 455/452.2 |
| 2004/0192341 | A1 | 9/2004 | Wang et al. | |
| 2005/0041696 | A1 | 2/2005 | Pekonen | |
| 2005/0215290 | A1 | 9/2005 | Wakabayashi et al. | |
| 2006/0268849 | A1 | 11/2006 | Larsson et al. | |
| 2007/0060130 | A1 | 3/2007 | Gogic et al. | |
| 2009/0181695 | A1 | 7/2009 | Wirola et al. | |
| 2009/0279502 | A1 | 11/2009 | Zheng et al. | |
| 2009/0319348 | A1 | 12/2009 | Khosravy et al. | |
| 2010/0202376 | A1 | 8/2010 | Zhu et al. | |
| 2010/0220665 | A1 | 9/2010 | Govindan et al. | |
| 2011/0143761 | A1 | 6/2011 | Uusitalo et al. | |
| 2012/0057569 | A1 | 3/2012 | Xie et al. | |
| 2013/0023274 | A1 | 1/2013 | Meredith et al. | |
| 2015/0288566 | A1* | 10/2015 | Sadek | ................. H04L 41/0823 370/254 |
| 2016/0029295 | A1* | 1/2016 | Nagasaka | ............. H04W 48/18 370/237 |

OTHER PUBLICATIONS

Final Office Action dated Oct. 11, 2016 in co-pending U.S. Appl. No. 15/065,539, filed Mar. 9, 2016.

* cited by examiner

| Wireless Device Name | Type | Frequency(GHz) | Lat | Long | BTS Utilization |
|---|---|---|---|---|---|
| SmallCell 1 | eNodeB | 5.354 | 30.40054 | -97.66400 | 0.5 |
| AP1 | AP | 5.352 | 30.40043 | -97.66368 | 0.25 |
| AP2 | AP | 5.356 | 30.40052 | -97.66348 | 0.4 |
| Small Cell 2 | eNodeB | 5.352 | 30.40031 | -97.66334 | 0.3 |
| AP3 | AP | 5.356 | 30.40017 | -97.66354 | 0.25 |
| AP4 | AP | 5.252 | 30.40033 | -97.66390 | 0.1 |

Local Quality of Service Record for BTS in Neighborhood WLAN

- BTS Name: EnterpriseAP1
- Radio Technology: WLAN
- Location (Latitude, Longitude): 30.409,-97.658
- Security Type: Passpoint
- Operational Band: 5 GHz
- Operational Channel: 36
- RF Channel Size (MHZ): 20
- RF Traffic Load: 10%
- Average Packet Loss: 5%
- Average Latency(ms): 25%
- Jitter (ms peak to peak): 3
- Voice Service Score: 60%
- Video Service Score: 70%
- Data Service Score: 90%

Local Quality of Service Record for BTS in Neighborhood WWAN

- BTS Name: PrivateEnterprise1
- Radio Technology: WWAN
- Location (Latitude, Longitude): 30.479,-97.658
- Security Type: eSIM
- Operational Band: 3.5 GHz
- Operational Channel: 10
- RF Channel Size (MHZ): 10
- RF Traffic Load: 15%
- Average Packet Loss: 1%
- Average Latency(ms): 30%
- Jitter (ms peak to peak): 1
- Voice Service Score: 95%
- Video Service Score: 90%
- Data Service Score: 90%

*FIG. 5*

METHOD AND APPARATUS FOR SELECTING AMONG MULTI-PROTOCOL RADIO TECHNOLOGY USING LOCAL QOS ADVERTISEMENT

CROSS REFERENCE TO RELATED APPLICATIONS

Related subject matter is contained in the following co-pending applications:

U.S. patent application Ser. No. 15/065,539, entitled "Method and Apparatus for Connection Context Aware Radio Communication Management," filed on Mar. 9, 2016, the disclosure of which is hereby expressly incorporated by reference in its entirety.

U.S. application Ser. No. 15/354,361, entitled "Method and Apparatus for Connection Context Aware Radio Communication Management for a Predicted Mobile Path," filed on Nov. 17, 2016, the disclosure of which is hereby expressly incorporated by reference in its entirety.

U.S. application Ser. No. 14/960,596, entitled "Method and Apparatus for Predicting Mobile Device Wireless Link Quality of Service Requirements Along a Predicted Path," filed on Dec. 7, 2015, the disclosure of which is hereby expressly incorporated by reference in its entirety.

U.S. application Ser. No. 14/886,603, entitled "Method and Apparatus for Determining Optimized Wireless Link Selection for a Mobile Device Along a Predicted Path," filed on Oct. 19, 2015, the disclosure of which is hereby expressly incorporated by reference in its entirety.

U.S. application Ser. No. 15/367,077, entitled "Method and Apparatus for Context Aware Concurrent Radio Communication with Co-existing WWAN and WLAN Radios in Shared Spectrum," filed on Dec. 1, 2016, the disclosure of which is hereby expressly incorporated by reference in its entirety.

U.S. application Ser. No. 15/362,702, entitled "Method and Apparatus for Concurrent Radio Communication in Shared Spectrum," filed on Nov. 28, 2016, the disclosure of which is hereby expressly incorporated by reference in its entirety.

U.S. application Ser. No. 15/375,449, entitled "Method and Apparatus for Context Aware Concurrent Data Transmission Scheduling for Pan Radio Technology," filed on Dec. 12, 2016, the disclosure of which is hereby expressly incorporated by reference in its entirety.

U.S. application Ser. No. 15/379,480, entitled "Method and Apparatus for Optimizing Multi-Protocol Radio Technology Using Local QOS Advertising," filed on Dec. 14, 2016, the disclosure of which is hereby expressly incorporated by reference in its entirety.

FIELD OF THE DISCLOSURE

The present disclosure generally relates to a method and apparatus for a radio resources communication management system to adapt to context and usage of communication channels in relation to users having a plurality of available radiofrequency communication devices.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination. Information handling systems may operate as base transceiver stations (BTSs) to provide wireless communications to a wireless network. Users may choose from among several available radiofrequency communication platforms in information handling systems for data and other communications with other users via communication and data networks.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 5 is a block diagram illustrating an RF band local QoS report according to an embodiment of the present disclosure;

DETAILED DESCRIPTION OF THE DRAWINGS

Figure 1:
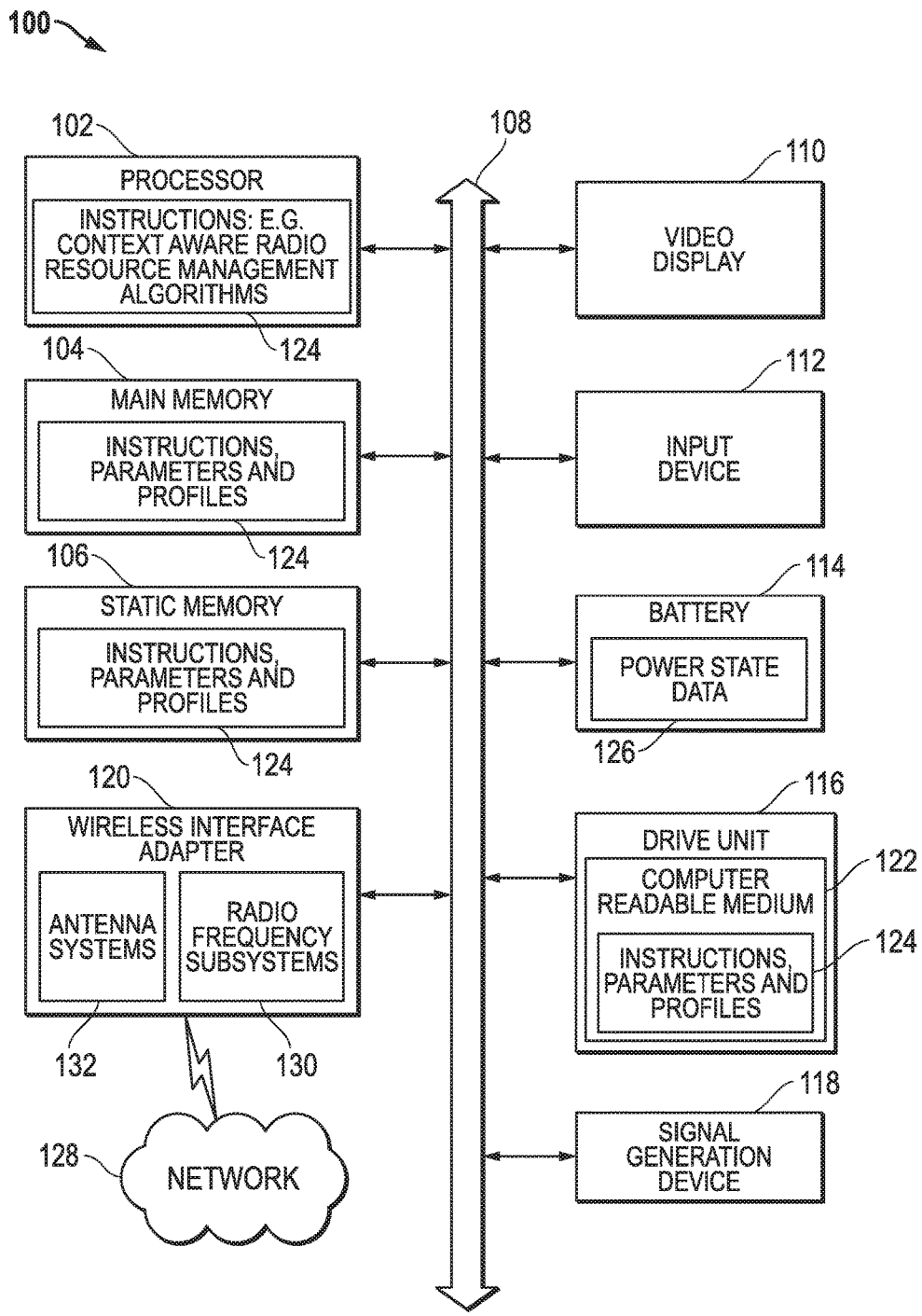
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), a base transceiver station or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

As wireless technologies blur across WLAN (such as Wi-Fi) with various emerging 5G radio interfaces, multiple radio solutions across a shared communication frequency band may become more available that will enable multiple connections including always-connected platforms. As part of this development, silicon integration provides for multiple radio protocol technologies to be used by a mobile information handling system operating in a wireless environment. For example, WLAN and WWAN communication across heterogeneous networks operating concurrently may provide for many options within a wireless neighborhood. With emerging 5G technologies and existing previous technologies, local wireless networks in a variety of WWAN protocols including WWAN technologies in microwave, cm/mm wave, and mm wave communication frequency bands. Examples of protocols in such WWAN technologies include LTE microwave WWAN, LTE cm/mm wave WWAN, and WiGig (mm wave) among others. These protocols may operate in unlicensed, shared communication bands. WLAN and small cell, unlicensed WWAN may operate in some shared bands in an example. Further, additional radios may be available on mobile information handling systems for communication within local wireless network neighborhoods. Some of these technologies may be same-band operation technologies as well and may utilize unlicensed, shared communication bands in some embodiments. For example, low power wireless area network (LPWAN) protocols LoRaWAN, LTE-MTC, NarrowBand IoT, UNB, Sigfox, Haystack and other protocols may operate within a shared band.

As a mobile information handling system moves into a local wireless network neighborhood it may not yet be connected to the internet or connected wirelessly. The present disclosure describes a broadcasting base transceiver system within the wireless neighborhood assessing congestion for base transceiver stations of various wireless protocols operating within the neighborhood and potentially within shared communication frequency bands according to an embodiment. According to another embodiment, the broadcasting base transceiver system may further assess quality of service levels or provide for wireless link ratings to base transceiver systems operating within the wireless neighborhood. In yet another aspect, the broadcasting base transceiver system may broadcast details of the base transceiver systems across wireless link protocols in the wireless neighborhood, including identification, load, and other factors on an unlicensed channel to a user mobile information handling system. In an embodiment, no authorization would be needed to access the broadcast local quality of service (QoS) information for the base transceivers. Further, no carrier access would be needed for such a system in several embodiments since the radio frequency band local QoS information would be available on an unlicensed channel. In a further embodiment, the radio frequency band local QoS information may be broadcast periodically or pursuant to a probe request for additional information as described in embodiments herein.

In another aspect of the present disclosure, the user information handling system that has entered the wireless neighborhood may access the unlicensed broadcast of the radio frequency band local QoS reports utilize them to select one or more wireless links. By utilizing the radio frequency band local QoS reports received from a hub base transceiver system, the mobile information handling system may minimize scanning to find wireless link options from a plurality of options and protocols. Use of radio frequency band local QoS reports may also reduce processing needed to determine optimal wireless links from using or accessing a context aware radio resources management system. The user mobile information handling system may access the broadcast radio frequency band local QoS reports without needing authorization to access before it has a wireless link established and before any internet connectivity may be established in some aspects.

In another aspect, the radio frequency band local QoS reports may provide a basis upon which to select a wireless link which may be modified by the receiving user mobile information handling system. For example, the battery power level state of the mobile information handling system may determine the an adjustment to the link ratings or may otherwise be implemented to determine selection of one or more wireless links in an embodiment. In another aspect, a user profile for a time and location of the user mobile information handling system may be used to determine a selected wireless link or wireless links in the wireless neighborhood. For example, the user profile of the mobile information handling system may reveal an anticipated wireless service usage in an embodiment. This anticipated wireless service usage type may be used to sort information received in the radio frequency band local QoS reports. The radio frequency band local QoS reports may include link ratings and those link ratings may be broken down by wireless service category. Wireless link cost considerations may be taken into account alone with QoS data and wireless load levels to affect which wireless link may be selected within a wireless neighborhood. In yet another aspect, user defined preferences for wireless links may have been established to alter weighting of wireless links and determine selection.

In some embodiments, the mobile information handling system may attempt to establish a plurality of concurrently operating wireless links. In such an embodiment, the radio frequency band local QoS reports may include information related to overall predicted interference for wireless links in the wireless neighborhood. The radio frequency band local QoS reports may include information on which base transceiver stations in the wireless neighborhood may operate on identical or adjacent frequency channels raising a risk of local interference at the mobile information handling system. Further, information may be available through the radio frequency band local QoS reports to show interference that may be present at base transceiver stations themselves such that use of such wireless links may have degraded QoS. Other aspects and embodiments are contemplated including several described herein.

FIG. 1 shows an information handling system 100 capable of administering each of the specific embodiments of the present disclosure. The information handling system 100 can represent the wireless communication devices 210, 220, and 230, base transceiver stations 240, 258, 259, 260 and 270 or other transceivers, or servers or systems 290 located anywhere within network 200 of FIG. 2, including the remote data center 286 operating as a virtual machine for applications described herein. Information handling system 100 may operate as a base transceiver device in some embodiments of the present disclosure. Additionally, information handling system 100 may represent a wireless communication device associated with a user or recipient of intended wireless communication.

Information handling systems such as a base transceiver device or other networked system may execute code instructions for an RF band local QoS advertising system according to embodiments of the present disclosure. A wireless communication device may execute instructions via a processor for a context aware radio resource management system which may include a concurrent wireless link optimization system according to additional embodiments disclosed herein. Further, an RF band local QoS advertising system may operate, in whole or in part, on a base transceiver station while other portions may operate on remote server systems. Similarly, in other aspects, the context aware radio resource management system, or the concurrent wireless link optimization system, may operate in some example embodiments as a software agent, in whole or in part, on a wireless communication device while other portions of the context aware radio resource management system including a concurrent wireless link optimization system may operate on remote server systems. Information handling system 100 may also represent a networked server or other system and administer aspects of the context aware radio resource management system including a concurrent wireless link optimization system via instructions executed on a processor according to various embodiments herein involving remote operation of such systems. Information handling system 100 may further represent a mobile user information handling system implementing the broadcast RF band local QoS reports and context aware radio resource management system to select one or more wireless links from among a plurality of wireless link options within a wireless neighborhood.

The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or display device. Display 110 may include a touch screen display module and touch screen controller (not shown) for receiving user inputs to the information handling system 100. Additionally, the information handling system 100 may include an input device 112, such as a keyboard, and a cursor control device, such as a mouse or touchpad or similar peripheral input device. The information handling system may include a power source such as battery 114 or an A/C power source. The information handling system 100 can also include a disk drive unit 116, and a signal generation device 118, such as a speaker or remote control. The information handling system 100 can include a network interface device such as a wireless adapter 120. The information handling system 100 can also represent a server device whose resources can be shared by multiple client devices, or it can represent an individual client device, such as a desktop personal computer, a laptop computer, a tablet computer, or a mobile smart phone. In some aspects, such as a base transceiver station, may not include some or more aspects of the information handling system as described. For example, a base transceiver station may not include a video display device 110 in an example embodiment.

The information handling system 100 can include a set of instructions 124 that can be executed to cause the computer system to perform any one or more of the methods or computer based functions disclosed herein. For example, instructions 124 may execute an RF band local QoS advertising system, a context aware radio resource management system, a concurrent wireless link optimization system, software agents, or other aspects or components. Similarly instructions 124 may execute the RF band local QoS advertising system and the context aware radio resource management system disclosed herein for determining optimal wireless links and traffic load for base transceiver systems in a wireless neighborhood. Instructions 124 may execute the RF band local QoS advertising system and context aware radio resource management system for monitoring base transceiver systems in a wireless neighborhood operating a plurality of wireless links and resources. In some aspects, instructions 124 may execute the RF band local QoS advertising system and the context aware radio resource management system disclosed herein for monitoring wireless adapters, wireless link access points, base stations, and other wireless resources for the purposes of assessing or modeling interference for concurrent operations within one or more wireless communication bands. Instructions 124 may also include aspects of the concurrent wireless link optimization system to remedy or adjustment to selected wireless link frequency channels that may yield interference due to nearness of transmission or reception in frequency channels and physical proximity. In other aspects instructions 124 may execute algorithms to regulate transmission or reception along those wireless channels selected but which occupy nearby, both physically and in frequency of wireless link channel, to minimize potential effects of interference. Various software modules comprising application instructions 124 may be coordinated by an operating system (OS) and via an application programming interface (API). An example operating system may include Windows®, Android®, and other OS types known in the art. Example APIs may include Win 32, Core Java API, or Android APIs. In a further example, processor 102 may conduct monitoring and processing of wireless communication device usage trends by the information handling system 100 according to the systems and methods disclosed herein. The computer system 100 may operate as a standalone device or may be connected such as using a network, to other computer systems or peripheral devices.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a palmtop computer, a laptop computer, a desktop computer, a wireless communications device, a wireless telephone, a land-line telephone, a base transceiver, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Further, the instructions 124 may embody one or more of the methods or logic as described herein. For example, instructions relating to the RF band local QoS advertising system and the context aware radio resource management system, or the concurrent wireless link optimization system software algorithms may be stored here. Scanned load data relating to transceivers and RF band local QoS reports generated may be stored here in main memory 104, static memory 106, drive unit 116, or remotely via network 128. Additionally, wireless communication device usage trend data for the context aware radio resource management system, interference models or measured interference profiles for the concurrent wireless link optimization system and wireless link profiles relating to context aware radio resource management system may be stored in various memory types. Wireless link profiles stored here may include end-user profile data measured by the processor 102 during wireless link usage. Profiles may additionally include crowd sourced spatial-temporal radio frequency profiles for wireless links or for energy link consumption data. Interference profiles may include models relating to locations of transmitters with respect to one another and relate to closeness (or identity) of operating frequencies during concurrent operation with a communication frequency band. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the RF band local QoS advertising system and the context aware radio resource management system of the present disclosure may be executed locally or remotely. The main memory 104 and the processor 102 also may include computer-readable media. Battery 114 may include a smart battery system that tracks and provides power state data 126. This power state data may be stored with the instructions, parameters, and profiles 124 to be used with the systems and methods disclosed herein.

The network interface device shown as wireless adapter 120 can provide connectivity to a network 128, e.g., a wide area network (WAN), a local area network (LAN), wireless local area network (WLAN), a wireless personal area network (WPAN), low power wireless area network (LPWAN), a wireless wide area network (WWAN), or other network. Further wireless adapter 120 may be used to receive broadcast data of one or more RF band local QoS reports to a local wireless neighborhood from a base transceiver station hub according to some embodiments. The wireless adapter 120 may receive broadcast on an unlicensed radio frequency band, such as 2.4 GHz. The broadcast may be received via a variety of broadcast methods including a broadcast channel or via generic advertising services. In other embodiments, a base transceiver system may have a wireless adapter to broadcast one or more RF band local QoS reports and to scan and monitor wireless channels in a wireless neighborhood. Connectivity may be via wired or wireless connection. Wireless adapter 120 may include one or more radio frequency subsystems 130 with transmitter/receiver circuitry, wireless controller circuitry, amplifiers and other circuitry for wireless communications. Each radiofrequency subsystem 130 may communicate with one or more wireless technology protocols in licensed or unlicensed spectrum. The radiofrequency subsystem 130 may contain individual subscriber identity module (SIM) profiles for each technology service provider and their available protocols. Alternatively it may have a software based SIM profile that is reconfigurable. In yet another aspect, the radiofrequency subsystem may include an eSIM for electronic control over activate SIM profile being used depending on the results of wireless link optimization analysis for context aware radio resource management system and for concurrent radio operation interference modeling or assessment. The wireless adapter 120 may also include antenna system 132 which may be tunable antenna systems for use with the system and methods disclosed herein. Further, radio frequency subsystem 130 may be a scanning radio frequency subsystem that may be capable of scanning among a plurality of channels in one or more radio frequency communication bands according to embodiments herein.

In some aspects of the present disclosure, one wireless adapter 120 may operate two or more wireless links. In one aspect, wireless adapters 120 may operate two or more wireless links in a plurality of separate communication frequency bands. Those frequency bands may be under a variety of protocols and may reside in licensed or unlicensed frequency spectrum. A wireless neighborhood may have a variety of wireless link protocols operating at a location or locations. Further, a plurality of the wireless link protocols may operate within a shared communication frequency band. In a further aspect, the wireless adapter 120 may operate the two or more wireless links with a single, shared communication frequency band. For example, a mobile information handling system 100 may operate concurrently via two or more wireless links to access expanded bandwidth or increased reliability of connections.

Shared communication frequency bands may be unlicensed bands such as with the 5G standard relating to unlicensed wireless spectrum for small cell 5G operation or for unlicensed Wi-Fi WLAN operation in an example aspect or within other frequency bands that are shared by protocols such as service provider LPWAN protocols in upcoming network environments. For example, a 5 GHz wireless communication frequency band may be apportioned under the 5G standards for communication on either small cell WWAN wireless link operation or Wi-Fi WLAN operation as described further below. In another embodiment, 3.5 GHz shared spectrum frequency band may be used to deploy small cell WWAN wireless links from a variety of service providers. In yet another embodiment, LPWAN systems such as used for IoT network systems may operate in a shared ISM band such as 900 MHz. Further, WPAN technologies may operate on shared bands under I.E.E.E. 802.15. In some embodiments, the shared, wireless communication band may be transmitted through one or a plurality of antennas. Other shared communication frequency bands are contemplated for use with the embodiments of the present disclosure as well.

In other aspects, the information handling system 100 operating as a wireless communication device may operate a plurality of wireless adapters 120 for concurrent radio operation in one or more wireless communication bands. The plurality of wireless adapters 120 may further share a wireless communication band in some disclosed embodiments. In other embodiments, a separate wireless adapter may be used according to some embodiments for broadcast communication of RF band local QoS reports.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers for connecting via a multitude of wireless links. In an example embodiment, an information handling system may have an antenna system transmitter 132 for 5G small cell WWAN, Wi-Fi WLAN, LPWAN, or WiGig connectivity and one or more additional antenna system transmitters 132 for macro-cellular communication. The radio frequency subsystems 130 include wireless controllers to manage authentication, connectivity, communications, power levels for transmission, buffering, error correction, baseband processing, and other functions of the wireless adapter 120.

The radio frequency subsystems 130 of the wireless adapters may measure various metrics relating to wireless communication pursuant to operation of the RF band local QoS advertising system and the context aware radio resource management system as in the present disclosure. For example, a base transceiver system may scan and listen to determine load of nearby base transceiver systems within wireless range of a wireless neighborhood. In another example, the wireless controller of a radio frequency subsystem 130 may manage detecting and measuring received signal strength levels, bit error rates, signal to noise ratios, latencies, jitter, and other metrics relating to signal quality and strength for the base transceiver system. In one embodiment, a wireless controller may manage one or more radio frequency subsystems 130 within a wireless adapter 120. The wireless controller also manages transmission power levels which directly affect radio frequency subsystem power consumption. To detect and measure power consumption by a radio frequency subsystem 130, the radio frequency subsystem 130 may implement current and voltage measurements of power that is directed to operate a radio frequency subsystem. The voltage and current provides power measurement in milliwatts. Energy consumed may be calculated from sample measurements by taking average power measured over a duration of transmission. In an alternative embodiment of power measurement, counter registers may be used to estimate power consumed during transmissions. Energy measurement may be a sampled during a count cycle. In this case, a sample energy measurement per count is multiplied into a count for operation of a radio subsystem. In this way, power consumption may be estimated in an example embodiment.

The wireless network may have a wireless mesh architecture in accordance with mesh networks described by the wireless data communications standards or similar standards. The wireless adapter 120 may also connect to the external network via a WPAN, WLAN, WWAN, LPWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs 124 and BIOS/FW code 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
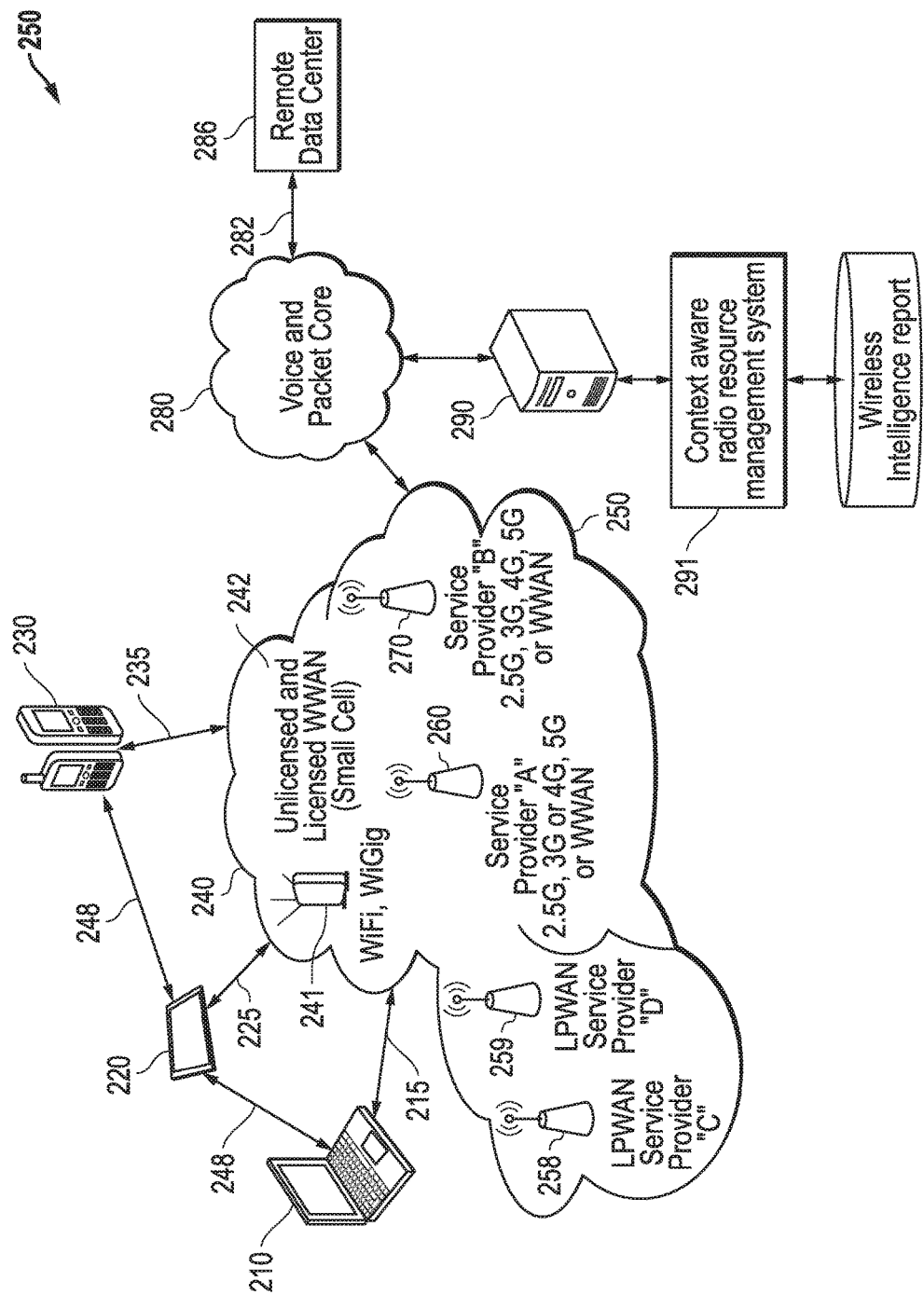
FIG. 2 is a block diagram of a network environment offering several communication protocol options and wireless communication devices according to an embodiment of the present disclosure.

FIG. 2 illustrates a network 200 that can include one or more information handling systems. In a particular embodiment, network 200 includes networked wireless communication devices 210, 220, and 230, wireless network access points, and multiple wireless connection link options. A variety of additional computing resources of network 200 may include client mobile information handling systems, data processing servers 290, network storage devices, local and wide area networks, or other resources as needed or desired. As specifically depicted, systems 210, 220, and 230 may be a laptop computer, tablet computer, or smartphone device. These wireless communication devices 210, 220, and 230, may access a wireless local network 240, or they may access a macro-cellular network 250. For example, the wireless local network 240 may be the wireless local area network (WLAN) 241, a wireless personal area network (WPAN), low power wireless area network (LPWAN), or a wireless wide area network (WWAN). In an example embodiment, LTE-LAA, or emerging 5G WWAN may operate with an anchor small-cell WWAN wireless option 242 with a supplemental unlicensed small cell WWAN wireless link option as well. In this example embodiment, the licensed LTE-LAA WWAN anchor link and the unlicensed small cell WWAN supplemental link may operate in different communication frequency bands. Similar arrangements for emerging 5G and other upcoming protocols are similarly contemplated in some embodiments. For example, emerging 5G may include small cell anchor WWAN data on a licensed band and supplemental small cell WWAN on an unlicensed band. In an embodiment of the present disclosure, the supplemental small cell WWAN radio capability may become a more primary source of data and communication links if the cost and availability of such wireless links become more prevalent.

In yet other embodiments, LPWAN systems such as LPWAN 258 from service provider "C" and LPWAN 259 from service provider "D" may operate on shared communication frequency bands in some example embodiments such as ISM bands. Other examples of competing protocols operating on shared communication frequency bands are also contemplated and discussed in embodiments herein.

Since WPAN or Wi-Fi Direct Connection 248 and WWAN networks 242 can functionally operate similar to WLANs, they may be considered as wireless local area networks (WLANs) for purposes herein. Components of a WLAN or other local wireless network 240 may be connected by wireline or Ethernet connections to a wider external network. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells.

In some embodiments according to the present disclosure, a networked wireless communication device 210, 220, or 230 may have a plurality wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Example competing protocols may be local wireless network access protocols such as Wi-Fi, WiGig, and small cell WLAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands that could be subject to future sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create issues with selection of optimal wireless links when concurrent communication on both WLAN and WWAN access may operate within the same communication frequency bands. For example, when a mobile information handling system such as 210, 220, or 230 enters a wireless neighborhood with such a plurality of wireless link options, limited information may be available to assist in selecting one or more wireless links with optimized quality and limited loading, cost, or power consumption. Such information may be provided for and presented by one or more base transceiver systems in a wireless neighborhood. For example, an RF band local QoS advertising system and the context aware radio resource management system may gather components of relevant information for base transceiver station systems according to embodiments herein and broadcast or make available that information for broadcast to the wireless neighborhood to assist in selection of one or more wireless links. Further, interference issues may be determined or may be addressed or mitigated with remedies according to the context aware radio resource management system including a concurrent wireless link optimization system 291 according to embodiments herein. Additionally, mobile information handling systems may make determinations based on wireless link ratings and information received via RF band local QoS reports according to embodiments herein.

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional wireless communication devices such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a wireless communication device or may connect directly to one or more wireless communication devices 210, 220, and 230. Alternatively, wireless communication devices 210, 220, and 230 may connect to the external network via base station locations at service providers such as 260 and 270. These service provider locations may be network connected via backhaul connectivity through the voice and packet core network 280.

Remote data center 286 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the wireless communication devices 210, 220, and 230 allowing streamlining and efficiency within those devices. Similarly, remote data center 286 permits fewer resources to be maintained in other parts of network 200.

In an example embodiment, the cloud or remote data center 286 or networked server 290 may run hosted applications for systems 210, 220, and 230. For example, remote data center 286, networked server 290, or some combination of both may operate some or all of an RF band local QoS advertising system and the context aware radio resource management system or a concurrent wireless link optimization system as disclosed in the present disclosure. This may occur by establishing a virtual machine application executing software to manage applications hosted at the remote data center 286 in an example embodiment. Wireless communication devices 210, 220, and 230 are adapted to run one or more applications locally, and to have hosted applications run in association with the local applications at remote data center 286 or networked server 290. For example, wireless communication devices 210, 220, and 230 may operate some or all of the RF band local QoS advertising system and the context aware radio resource management system including a concurrent wireless link optimization system agent in some embodiments. The virtual machine application may serve one or more applications to each of wireless communication device 210, 220, and 230. Thus, as illustrated, mobile information handling systems 210, 220, and 230 may be running applications to select wireless links locally while requesting data objects related to those applications from the remote data center 286 via wireless network. In another example, an electronic mail client application may run locally at system 210. The electronic mail client application may be associated with a host application that represents an electronic mail server. In another example, a data storage client application such as Microsoft Sharepoint may run on system 220. It may be associated with a host application running at remote data center 286 that represents a Sharepoint data storage server. In a further example, a web browser application may be operating at system 230. The web browser application may request web data from a host application that represents a hosted website and associated applications running at remote data center 286.

Although 215, 225, and 235 are shown connecting wireless adapters of wireless communication devices 210, 220, and 230 to wireless networks 240 or 250, wireless communication may link through a wireless access point (Wi-Fi or WiGig), through unlicensed WWAN small cell base stations such as in network 240 or though a service provider tower such as that shown with service provider A 260 or service provider B 270 and in network 250. Further, the wireless communication devices 210, 220, and 230 may receive broadcast RF band local QoS advertising reports via wireless links operating on unlicensed communication frequencies such as those occupied by Wi-Fi or similar protocols. In other aspects, wireless communication devices 210, 220, and 230 may communicate intra-device via 248 when one or more of the wireless communication devices 210, 220, and 230 are set to act as a access point or even potentially an WWAN connection via small cell communication on licensed or unlicensed WWAN connections. For example, one of wireless communication devices 210, 220, and 230 may serve as a Wi-Fi hotspot in an embodiment. Since one aspect of the disclosed embodiments involves assessment base transceiver systems and of wireless links by an RF band local QoS advertising system and the context aware radio resource management system including a concurrent wireless link optimization system, no particular wireless link selection is depicted in FIG. 2.

The connection quality of service (QoS) and speed of wireless links 215, 225, and 235 may vary widely depending on several factors including the service provider bandwidth, the number of wireless communication devices and users in a location, and other factors. Quality of service impacts energy consumption and efficiency of a wireless communication device communicating wirelessly. Thus, selection of a wireless link may depend on assessment of the link radio frequency conditions. Assessment of link radio frequency conditions may be made via the RF band local QoS advertising system and the context aware radio resource management system assessing load for a wireless neighborhood and reporting QoS aspects of available wireless links. For example, a context aware radio resource management system may develop a link rating for a plurality of wireless links. Radio frequency conditions for wireless links will evolve over time. Load may change over time on various base transceiver systems. Differences in wireless link QoS or efficiency will also vary minute-by-minute, hourly, daily, weekly or monthly or during even longer periods. Thus, assessment may need to be regular. Scanning neighborhood base transceiver station systems for load may be conducted periodically and contributed to wireless intelligence reports for a wireless neighborhood. Further, wireless intelligence reports may be gathered or crowd sourced in a database accessible by the context aware radio resource management system including the concurrent wireless link optimization system. The wireless intelligence report data base may include wireless link data with respect to wireless link quality of service and experience for a plurality of wireless links at various locations and for particular types of data usage. This data may be related to particular base transceiver station systems within a wireless neighborhood. Additional database information may be available to the context aware radio resource management system including a concurrent wireless link optimization system relating to wireless service usage trends for wireless communication devices such as 210, 220, and 230. These wireless service usage trends may be tracked according to time of day, day of the week, location or other similar factors to indicate how wireless links are used in wireless communication devices such as 210, 220, and 230. Some wireless service usage trend data may be stored at the wireless communication devices 210, 220, and 230. A context aware radio resource management system may operate in part on wireless communication devices 210, 220, and 230 to select one or more wireless links in accordance with anticipated usages based on the usage trend data. In other aspects this data and reporting for wireless service usage types may be reported to the context aware radio resource management system which may interface with the RF band local QoS advertising system.

Wireless link conditions will vary depending on the type of service likely to be requested by the mobile information handling system. For example, voice communication may be most efficient on a 2G wireless protocol. Voice communication on 4G and emerging 5G may be more costly in terms of time required for authentication and connectivity negotiation or in terms of transmission power requirements. Data services relating to messaging and SMTP email may have the lowest power cost on 2.5G protocols due to the simplest access barriers there. Higher level data services requiring greater wireless bandwidth may more efficiently use recently implemented protocols. For example, audio streaming may be optimal for 3G protocols. Video streaming and HTTP web browsing may be best suited to 4G protocols or emerging 5G and much less efficient at lower protocols which are not designed to accommodate large data throughput.

As the protocols become more advanced, additional registration and initialization for data becomes costly from a processing and power consumption standpoint. This is balanced against the capabilities of the more advanced protocols to handle data transfers. More complicated communication protocols result in greater processing time and authentication/connection message exchange. More robust processor or controller operation and longer delays for transmitter or receiver circuits consume power. On the other hand, certain protocol advancements are designed to make data transfers quicker and more efficient. Thus for example, the 4G or 5G protocol may generally consume more power during operation than 2.5G for voice communications, but less power for high volume data transfers.

For this reason, the wireless communication device operating context can play an important role in determining wireless link conditions and efficiency from a power consumption standpoint. Information about wireless link connection quality and capacity for a service to be used can be advantageous in optimizing communication channel selection. In most cases, transmission or reception via a macro-cellular network 250 base station at a service provider 260 or 270 will take more power than communication via WLAN such as Wi-Fi, via a LPWAN, or via a small cell WWAN wireless link. Among macro-cellular systems, energy consumption generally, but not in all circumstances, increases at each advancement of technology protocol from 2G to 5G. Additional future macro-cellular protocols are contemplated as well. Those protocols may require additional energy demands of mobile information handling systems.

Additionally, often the QoS of an end-to-end wireless communication path between wireless communication devices of a user and a recipient will most directly be affected the QoS levels at the end stages of the wireless communication path. For example, the wireless link QoS between a user wireless communication device and the wireless network on one end and the wireless link QoS between a recipient wireless communication device on the other end are often the places where communication path quality compromise, capacity limitation, or latency is most likely to occur.

Increased traffic levels or loads on wireless link protocol may slow down the wireless link in comparison to another technology with less active traffic. This may also cause greater energy consumption for transmission on a congested wireless link. Factors impacting energy consumption include switching and signaling during communication access, setup, and authentication. Additional factors that impact energy consumption include control communications, latencies, transmission/reception, and switching for the wireless link. As described above, these factors can be specific to the type of wireless service being requested, whether voice, messaging, SMTP, Audio, Video, HTTP or other service types. It can also be specific to the wireless communication device used. Certain protocols may not be available on some mobile information handling systems. In each instance, radio frequency transmission subsystems and controllers operate and consume device power. Based on these numerous factors, the system of the present embodiment may automatically switch between radio network technologies or service providers to optimize radio frequency conditions, traffic conditions, device power consumption, cost, or any of the above. Selection of a wireless service provider and technology protocol may generally depend on the optimal wireless technology used for a service requested, the radio frequency conditions of a link, traffic conditions for the wireless link, and availability of a link.

Further, concurrent radiofrequency bands may be used having several channels for wireless link connections and which may include with potential overlapping use of shared radiofrequency bands including unlicensed bands and conditional shared communication frequency bands available under FCC Part 96 with use under Wi-Fi, small cell WWAN, LPWAN, and emerging 5G technologies such as unlicensed small cell wireless links. For this reason, wireless link protocols in a wireless neighborhood may not coordinate channel usage and congestion issues for available wireless links. Further, concurrent use by mobile information handling systems of a shared communication frequency band may arise. Accordingly, wireless links 215, 225 and 235 may represent concurrent wireless links for two or more protocols operating within similar frequency bands. With the rise of multiple wireless protocols operating within shared communication frequency bands, wireless links may operate on separate channels within the communication frequency band, including within neighboring channels. In other aspects, the possibility further arises that wireless protocols within a communication frequency band may even attempt to operate on the same channel within a shared communication frequency band. Reporting of congestion amongst wireless link protocols sharing a radio frequency communication band for a wireless neighborhood may provide simplified information for decisions to access one or more wireless links. Aspects of the present disclosure may determine potential conflicts within shared communication frequency bands as well as manage or mitigate interference that may arise within such situations.

An RF band local QoS advertising system and the context aware radio resource management system with a concurrent wireless link optimization system 291 may assess channels for potential interference and conflict within the shared communication frequency bands and provide RF band local QoS reports via unlicensed broadcast. RF band local QoS advertising system may scan load levels on channels within the shared communication frequency band. The context aware radio resource management system 291 may maintain RF traffic reports relating to wireless links at a database. That database may be located within the wireless network for example at remote data center 286. RF traffic report database aggregates wireless link QoS data across the wireless network and with respect to base transceiver stations operating with the context aware radio resource management system including a concurrent wireless link optimization system of the present disclosure. The RF traffic report database of the context aware radio resources system maintains performance data of service providers and various wireless protocols available for a wireless neighborhood. The aggregated RF traffic report database may be accumulated or crowd sourced from multiple wireless communication devices for base transceiver systems operating in a given wireless neighborhood. The RF band local QoS advertising system may then broadcast this information to mobile information handling systems entering a wireless neighborhood to assist in determination of an appropriate wireless link. This feature will be described further below.

Further, the concurrent wireless link optimization system of the context aware radio resource management system 291 may determine or model interference to be experienced by selection of wireless links for multiple protocols, or even for a protocol operating on several channels, that operate simultaneously within a radiofrequency communication band. Wi-Fi/WiGig WLAN protocols, small cell WWAN protocols, LPWAN protocols, Bluetooth, Zigbee, and other WPAN protocols, in an example embodiment, may operate in the same shared communication frequency bands. Data relating to neighborhood interference lists, access point and small cell substation locations, and modeled or measured interference during operation of simultaneous wireless links within a shared communication radiofrequency band are stored by the concurrent wireless link optimization system portion of the context aware radio resource management system 291 in a database, at a remote data center 286, or at individual wireless communication mobile devices 210, 220, or 230. The concurrent wireless link optimization system 291 may determine or alter selection of optimal wireless links based on assessment of potential interference or collision from selection of those wireless links and the channels within the shared band on which they are operating. In other embodiments, the concurrent wireless link optimization system may implement interference or collision mitigation strategies if optimal wireless links are to be selected due to availability, link quality, usage trends, cost, power or other factors taken into consideration by the wider context aware radio resource management system. In another example embodiment where licensed and unlicensed small cell WWAN communications are available, utilization of the free, unlicensed small cell WWAN on a shared communication frequency band may be turned off and the anchor licensed small cell WWAN on a licensed communication frequency band may be used instead to avoid interference or potential packet collision. Several example embodiments of the operation of the wireless link optimization system 291 are described in the present disclosure.

Figure 3:
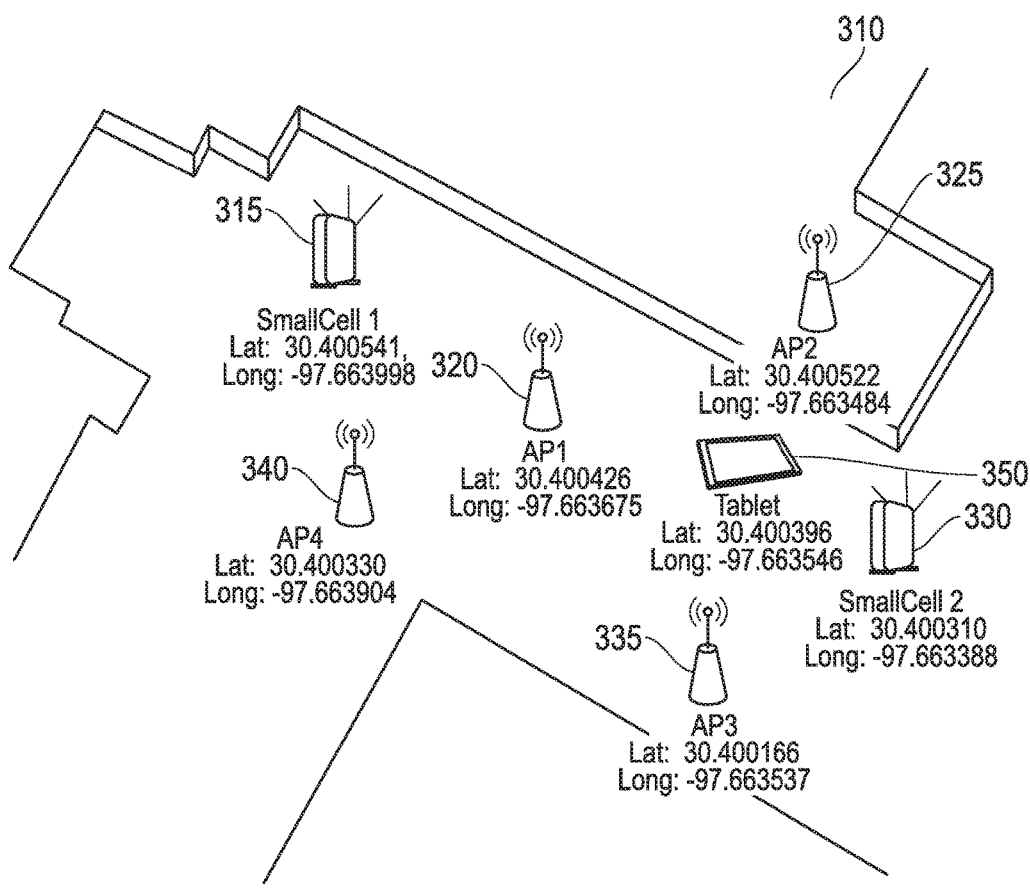
FIG. 3 is a block diagram illustrating a wireless network neighborhood available to a mobile information handling system according to an embodiment of the present disclosure.

FIG. 3 illustrates a wireless neighborhood 310 in an example embodiment. The wireless neighborhood may be a building, campus, shopping area, airport, or other area having a plurality of competing wireless link options available. In some aspects, the wireless neighborhood may be facilities or a campus associated with an enterprise, military, university, government or municipal organization. Within wireless neighborhood 310 there is a plurality of base transceiver systems (BTSs) including several access points (APs) including AP1 320, AP2 325, AP3 335, and AP4 340. As shown, each of the access points may record and report a position including latitude and longitude values. Additionally, in wireless neighborhood 310 is a plurality of small cell WWAN substations such as SmallCell 1 315 and SmallCell 2 330. SmallCell 1 315 and SmallCell 2 330 additionally may report latitude and longitude location information. Reports of location may be made to the RF band local QoS advertising system and the context aware radio resource management system.

Wireless neighborhood 310 represents a plurality of BTSs operating within a shared communication frequency band such as U-NII band in an example embodiment. The BTS wireless devices may be operating in a plurality of wireless link protocols and may operate across several communication frequency bands and for various wireless link protocols. For example, a shared communication frequency band in the wireless neighborhood 310 may support a plurality of LPWAN protocols, WiGig, or other protocols.

In another aspect, mobile information handling system 350 may enter wireless neighborhood 310 seeking to find a wireless link or plurality of wireless links for network connectivity. As mobile information handling system 350 enters the wireless neighborhood, it may access broadcast RF band local QoS reports to select a BTS providing a wireless link. One BTS may host an RF band local QoS advertising system. For example, a hub BTS system that hosts the RF band local QoS advertising system may be designated from either an AP or a SmallCell WWAN base station. Additionally, one or more APs or SmallCell WWAN basestations may serve as an auxiliary hub BTS according to some embodiments.

In a further example embodiment, mobile information handling system such as tablet 350 may have access to carrier licensed small cell WWAN service under emerging 5G and other technologies. With the carrier licensed small cell WWAN service, an anchor small cell BTS (not shown) may be available for WWAN access under a separate licensed communication frequency band. The licensed communication frequency band may be licensed to a specific wireless service provider or other carrier. Since the licensed communication frequency band is a distinct band from the shared unlicensed communication frequency band, local interference is reduced not a substantial issue. However, a licensed communication frequency band such as via an anchor small cell BTS will have a cost associated with it and may be less desirable than bandwidth on an available unlicensed small cell WWAN BTS. The unlicensed small cell WWAN capacity for mobile information handling system 350 may be supplementary bandwidth to the licensed small cell WWAN in an example embodiment. Determination of interference risk for use of the supplementary unlicensed small cell WWAN link may be used in assessment of options between licensed and unlicensed small cell WWAN to be used by mobile information handling system 350 when operating concurrent wireless links according to some embodiments.

The RF band local QoS advertising system and the context aware radio resource management system may advertise reports of load, QoS, for channels and BTS wireless devices within wireless neighborhood 310. A BTS system may serve as a hub, such as an AP 320, to broadcast RF band local QoS reports to mobile information handling systems such as 350. When a mobile information handling system such as 350 enters a wireless neighborhood 310 without a preexisting internet connection, it may access a broadcast RF band local QoS report from the RF band local QoS advertising system and the context aware radio resource management system. Such an RF band local QoS report may be available via an unlicensed channel with no need for authorization to access. The RF band local QoS reports are used by mobile information handling system 350 in determining optimal wireless links for communication according to various embodiments described herein.

The RF band local QoS advertising system may maintain neighborhood BTS lists such as 305 pertaining to wireless BTS devices in the wireless neighborhood 310. The hub BTS device in the wireless neighborhood with some or all of a RF band local QoS advertising system operating thereon may scan the shared communication frequency to assess each channel for BTS devices operating thereon according to some embodiments. The hub BTS may be AP 1 320 in an example embodiment and may scan the wireless neighborhood 310 for the additional APs 325, 335, and 340 for channels and for load on each of those AP devices in an example embodiment. In some embodiments, the hub BTS AP 1 320 may also have a tandem scanning modem capability of scanning for unlicensed small cell WWAN base stations 315 and 320. In another embodiment, one unlicensed small cell WWAN base station may serve as an auxiliary hub base station and scan the other base stations in the wireless neighborhood. For example, small cell WWAN base station 315 may scan for other base stations, such as small cell WWAN base station 330 and report that information relating to channel identity, BTS identification, load and other details back to the hub BTS such as AP 1 320.

Each of the BTS wireless devices are listed in 305 for the wireless neighborhood and the type of wireless link supported may be determined. Further, neighborhood BTS lists 305 may include operating channel frequencies and location of each of the wireless link access options that are either APs or small cell WWAN substations in the present embodiment. In other embodiments, additional communication frequency bands, including other shared communication frequency bands, may be assessed for the plurality of BTS wireless devices serving the wireless neighborhood 310. Shown in example embodiment 305 are operating channel frequencies are those that fall within one shared communication frequency band in an embodiment. Finally, the concurrent wireless link optimization system may establish BTS utilization metrics which may involve estimation of levels or rating of utilization of the APs and the small cell WWAN substations in the neighborhood BTS lists 305. In some embodiments, the neighborhood BTS lists may be used to prepare RF band local QoS reports for the RF band local QoS advertising system. In other embodiments, the neighborhood BTS list 305 may be used, such as for the example shared communication band at 5 GHz, to assess potential interference at the BTS level as well as potential local interference experienced by a mobile information handling system such as tablet 350.

Figure 4:
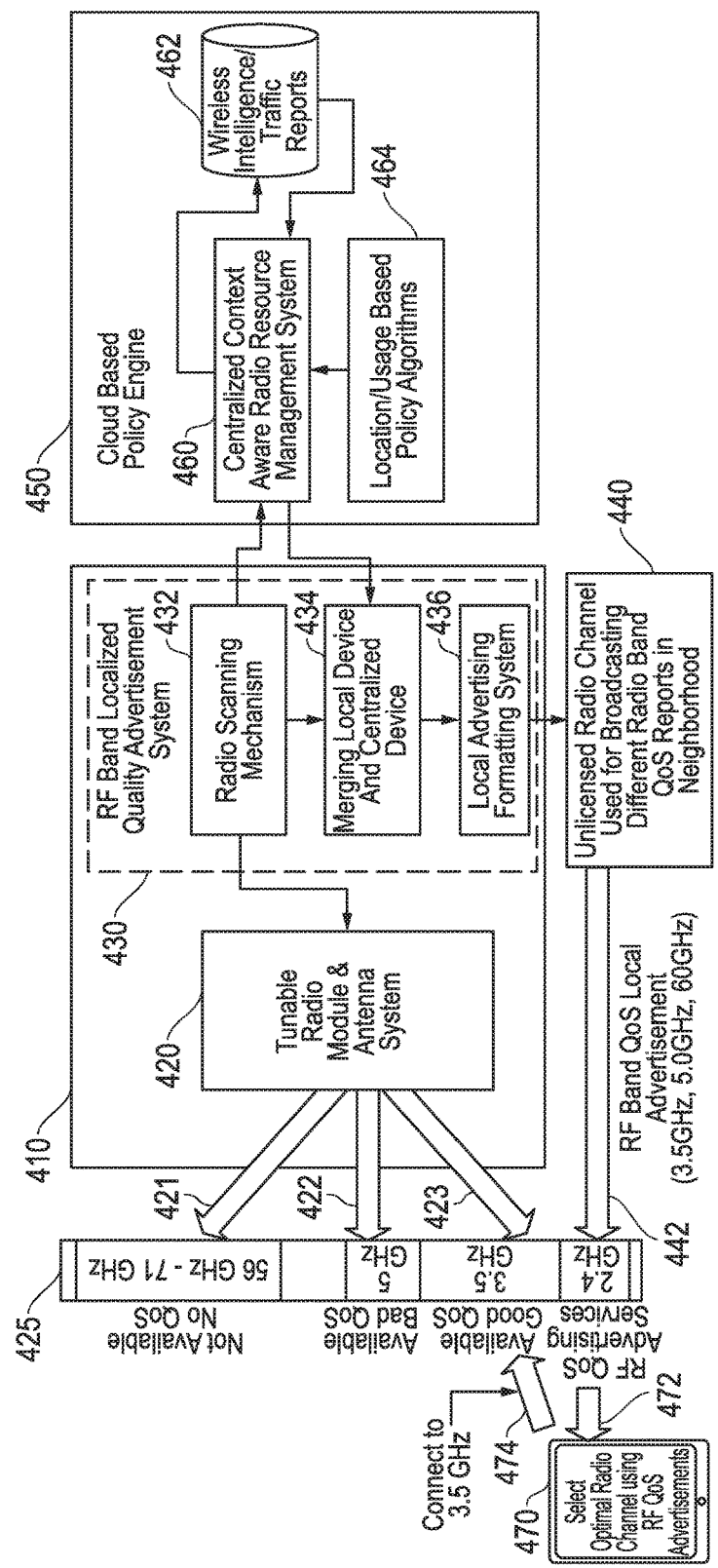
FIG. 4 is a block diagram illustrating an RF band local QoS advertising system according to an embodiment of the present disclosure.

FIG. 4 illustrates an example RF band local QoS advertising system 430 and the context aware radio resource management system 460 according to an example embodiment of the present disclosure. In particular, the embodiment of FIG. 4 shows a RF band local QoS advertising system 430 for localized channel occupancy and load reporting on one or more shared communication frequency bands 425 in a wireless neighborhood. In one example embodiment, an unlicensed shared communication band 425 may be the Unlicensed National Information Infrastructure (U-NII) band which typically operates in the ~5 MHz frequency band 422 such as 802.11a/h/j/n/ac (e.g., center frequencies between 5.170-5.785 GHz). In other example embodiments of shared communication frequency bands may also include shared 3.5 GHz 423 under Citizens Broadband Radio Service that is a shared band that may operate with licensed and unlicensed protocols. Other example shared bands that may support embodiments discussed herein may further include ISM 2.4 GHz 442, and 56-71 GHz 421 shared communication frequency bands. In addition to supporting WLAN and small cell unlicensed WWAN protocols, each of the above shared communication frequency bands may also support other various competing protocols such as LPWAN protocols among others.

In this example embodiment, the RF band local QoS advertising system 430 may reside on a hub BTS wireless device 410 which may include a tunable radio module and antenna system 420. In other embodiments, some or all of the RF band local QoS advertising system 430 may reside and operate remotely as described herein. Tunable radio module and antenna system 420 for hub BTS 410 may operate in at least one shared communication frequency band 421, 422, or 423 and be tunable for a variety of channels within each shared communication frequency band 425. In one example embodiment, hub BTS 410 may further have a tunable radio module and antenna system 420 that may operate on a plurality of shared communication frequency bands such as any of 421, 422, 423, and 442.

Some embodiments may include, BTSs for competing protocols in a shared communication frequency band such as WLAN and small cell WWAN protocols operating in a 5 GHz frequency band. Other competing wireless link protocols in a shared communication band may include competing LPWAN protocols including LoRaWAN, LTE-MTC, NarrowBand IoT, UNB, Sigfox, or Haystack as examples that may operate within a shared communication band. The tunable radio module and antenna system 420 may scan for and generate a neighborhood BTS list determining the channels on which detected APs and small cell WWAN wireless links are operating in an example embodiment. In another example, neighborhood BTS list may be generated by determining the channels on which detected BTSs for LPWAN protocols are operating.

A network interface driver may be part of tunable radio module and antenna system 420 which may have available front end RF circuitry for radio operation in a plurality of additional wireless links or a plurality of radio frequency bands.

RF band local QoS advertising system 430 may include a radio scanning modem 432, a merger module 434, and a local advertising RF band local QoS report formatting system 436. RF band local QoS advertising system 430 may be utilized according to embodiments herein to determine channel by channel occupancy by wireless neighborhood BTS systems and to gather information about those BTS systems including current load capacities via radio scanning modem 432. Radio scanning modem 432 may be instructed to scan each channel for BTS system activity among each of the shared communication frequency bands 425. In some example embodiments, hub BTS 410 may only operate in one or a few shared communication frequency bands and on only one or a few types of wireless protocols. For BTS systems on different wireless protocols or for different shared communication frequency bands not supported by hub BTS, auxiliary hub BTS systems specific to theses wireless link protocols or other shared communication frequency bands may have radio scanning modems for collecting BTS information including load information. The auxiliary hub BTS systems with scanning modems may report BTS data including load data for other wireless link protocols or radio frequency bands back to the RF band local QoS advertising system 430 at hub BTS device 410.

RF band local QoS advertising system 430 may also include a merging engine 434 for merging both load and neighborhood BTS system data locally gathered for a wireless neighborhood with remotely acquired data on wireless links from a context aware radio resource management system 460. Merging engine 434 may associate data, such as link ratings for operating wireless links, with locally collected data for BTS devices in a wireless neighborhood of hub BTS device 410.

RF band local QoS advertising system 430 may report locally scanned load and other BTS device data scanned in a wireless neighborhood to the context aware radio resource management system 460 remotely located at a cloud location 450 such as a server system or a mobile information handling system. Some aspects of the context aware radio resource management system 460 are described in several embodiments in U.S. Pat. Nos. 9,088,859, 9,119,039, 9,210,714, 9,167,591 as well as several applications to the same assignee and incorporated herein by reference. The context aware radio resource management system 460 may include a concurrent wireless link optimization system as described in various embodiments herein. The context aware radio resource management system 460 may reside on a remote data center or may reside on a user information handling system. Portions may reside on the mobile information handling systems which seek to potentially access a plurality of concurrent wireless links or may reside on a hub BTS system in some example embodiments.

The centralized context aware radio resource management system 460 may access wireless intelligence/traffic reports 462 to determine wireless link ratings for wireless links operating on the BTS wireless devices within the wireless neighborhood of hub BTS 410. Centralized context aware radio resource management system 460 may also access location/usage based policy algorithms 464 such as provided in user profiles for particular data service types to further develop wireless link ratings according to some embodiments. Several embodiments of the operation of a centralized context aware radio resource management system 460 are described in various embodiments herein including with respect to FIG. 6. Link ratings or QoS data for wireless links associated with BTS systems may be reported to merging engine 434 for merger of data with locally determined BTS system data for the wireless neighborhood.

RF band local QoS advertising system 430 may also include a local advertising formatting system 436 which may select a RF band local QoS report format for broadcast. The local advertising formatting system 436 may also establish the broadcast of the RF band local QoS reports 440 to mobile information handling systems such as 470 in the wireless neighborhood. The RF band local QoS advertising system 430 may use an unlicensed radio channel such as 442 to broadcast RF band local QoS reports 440. Formats of the RF band local QoS reports 440 may be varied and established according to embodiments herein including the embodiments shown in FIG. 5. In another embodiment, a table format such as interference table 305 in FIG. 3 may be used. It is understood that any other format of transmitting data about the local conditions for BTS systems in the wireless neighborhood may be used.

The RF band local QoS reports 440 may be broadcast periodically on a WLAN broadcast channel in the unlicensed spectrum such as 2.4 GHz ISM shared frequency band 442 in some embodiments. Other embodiments may use a different unlicensed frequency band 425. The RF band local QoS reports 440 may be broadcast with relative frequency in an aspect so that newly arriving mobile information handling systems such as 470 may have access to the local wireless neighborhood QoS data at 472. No authorization is necessary for access to the RF band local QoS reports 440 on the unlicensed radio channel 442.

In some embodiments, the RF band local QoS reports may be available via advertisement that the reports are available on a generic advertisement service (GAS) such as used with Wi-Fi WLAN protocols. The GAS protocols may operate under 802.11u for example and advertise the availability of the RF band local QoS reports 440 within a vendor specific reserved area in a beacon tag. Upon indication that RF band local QoS reports 440 are available via GAS on an unlicensed communication channel 442, a mobile information handling system 470 may generate a probe to request the RF band local QoS reports 440. Again, no authorization would be necessary to access the RF band local QoS reports 440. The mobile information handling system 470 may utilize the RF band local QoS reports 440 to assist in selection of a wireless link 474 for connection in the wireless neighborhood. For example, the RF band local QoS reports 440 may be used in accordance with embodiments herein to select an optimized radio channel. The mobile information handling system 470 may determine the optimal wireless links from the RF band local QoS reports 440 and further based on additional information relating to cost, power consumption, anticipated usage, or preference settings to adjust selection of the wireless links. Mobile information handling system may operate a portion of a context aware radio resource management system to assist in final determination of the wireless link. In an example embodiment, wireless link 474 may be selected for a BTS on a channel in the 3.5 GHz band. Any channel or wireless link may be selected according to the embodiments herein.

FIG. 5 illustrates an example of RF band local QoS reports that may be broadcast by a hub BTS on an unlicensed channel. Broadcast of the RF band local QoS reports may be made to mobile information handling systems to assist in providing expedient information on BTS systems and wireless links for a wireless neighborhood. With these RF band local QoS reports, mobile information handling systems may determine a selection of one or more wireless links to connect with according to some embodiments herein. In other embodiments, the mobile information handling systems may utilize the broadcast RF band local QoS reports with additional data such as anticipated usage, power levels, local interference potential, cost or preference settings to make a determination of one or more wireless links for communication in a wireless neighborhood. The RF band local QoS reports may include reports for BTS systems in various bands and in various wireless links. In the example embodiment, an RF band local QoS report includes a report component 510 for a neighborhood WLAN BTS device called EnterpriseAP1. The localized RF Band Quality Advertisement Engine may generate a portion 512 of the RF band local QoS report 510. The locally generated portion 512 of the RF band local QoS report 510 may include identification of the BTS in a wireless neighborhood, the wireless link protocol, the location, security type, operation band and channel. Further, the local portion 512 of RF band local QoS report 510 may include channel size information as well as scanned RF traffic load information. Additional information such as identifying information, for example SSID data, may be similarly included as understood. Local portion 512 may include load determinations as well. In some aspects however, load information may be a blend of data from both the local scanning and remotely sourced data from a centralized context aware radio resource management system.

In an embodiment another portion 514 of RF band local QoS report 510 may be derived from information received from a centralized context aware radio resource management system in accordance with embodiments herein. Portion 514 of RF band local QoS report 510 may include QoS measurement information or ratings or may include wireless link ratings for the wireless link operating via the BTS system. In this particular embodiment, the RF band local QoS report 510 may include a usage-based wireless link rating score in portion 514 derived from the context aware radio resource management system.

In another example embodiment, RF band local QoS report 520 is shown for a small cell WWAN base station. In this particular embodiment, the small cell WWAN base station is identified as called PrivateEnterprise 1. Locally derived BTS information portion 522 may include BTS device identification, radio protocol type, location, security type, and a radio communication band. In this embodiment, the 3.5 GHz band is used for small cell WWAN base station operation. Additional information may be provided on the locally derived portion 522 of RF band local QoS report 520 including channel, channel size, and traffic load. In some aspects, BTS load data may be partially sourced from remotely sourced information as well. Likewise to RF band local QoS report 510, a remote sourced portion 524 may be derived from a data received from a centralized context aware radio resource management system. Portion 524 may include QoS measurements or ratings or may include link ratings for service usages for the BTS identified.

In an embodiment, RF band local QoS report 510 and RF band local QoS report 520 may be part of a larger RF band local QoS report including information on several BTS system in a wireless neighborhood. The overall RF band local QoS report may be organized by wireless protocol type in one example embodiment. In another example embodiment, an overall neighborhood RF band local QoS report may be organized by wireless link rating or operational communication frequency band. In some embodiments, the wireless neighborhood RF band local QoS report may only include one or a few top rated BTS systems for particular wireless link protocols. In other aspects, overall RF band local QoS report may include one or more recommended BTS systems and associated radio channels for the wireless neighborhood. It is understood that the wireless neighborhood RF band local QoS report may include individual sub report components similar to RF band local QoS report 510 and RF band local QoS report 510 including one or more radio frequency communication bands, wireless link protocols, and organized according to usages, link ratings, QoS, load, or a variety of other organizing principles.

In the example embodiment, link ratings are shown in 514 and 524 for particular usage service types including voice services, video services, and data services. This usage based link rating may be utilized with the usage profile of the mobile information handling system to select an optimal BTS in the wireless neighborhood for an anticipated service usage. Additionally, traffic load at 512 and 522 as well as QoS metrics (packet loss, latency, jitter) at 514 and 524 may be used as link ratings for BTS systems available to a mobile information handling system. Such data may be assessed along with power requirements or battery levels to select a BTS for connection. In yet another example embodiment, operational channel, channel size, and communication band may be used by a mobile information handling system to discern the risk of local interference between protocols operating within a shared communication band when concurrent wireless links are to be selected. In another example embodiment, location and channel/channel size data along with shared band and protocol information may be used to assess potential BTS level interference as a component of potential overall interference that may arise due to selection of a plurality of BTSs for concurrent operation. Accordingly, the RF band local QoS reports may provide a recommendation for a BTS to a mobile information handling system that is outright followed in some embodiments, they may also provide a baseline of wireless neighborhood condition data as a greeting to a mobile information handling system entering a wireless neighborhood. This RF band local QoS report data may be used as a basis upon which a further determination of wireless link selection may be made by each mobile information handling system according to embodiments herein. In a particular embodiment, the RF band local QoS reports may assist local operation of a portion of the context aware radio resource management system on a mobile information handling system. The context aware radio resource management system operation and link rating determinations for selection of optimal wireless links is further described herein in embodiments and in related patents incorporated by reference herein.

Figure 6:
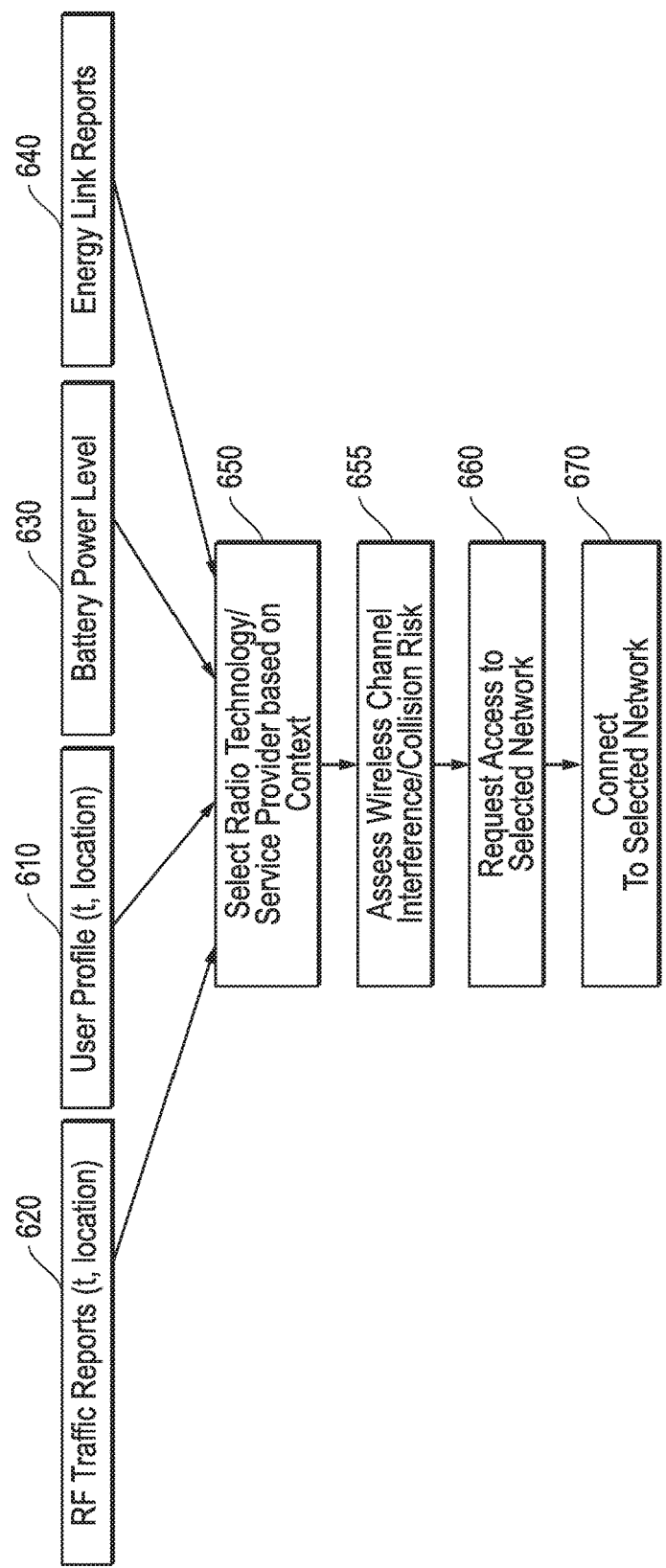
FIG. 6 is a block diagram illustrating a context aware radio resource management system according to an embodiment of the present disclosure.

FIG. 6 shows a context aware radio resource management system including a concurrent wireless link optimization system. The context aware radio resource management system may operate to determine a list of optimized wireless links based on a link rating system described in embodiments herein. In an aspect, link rating may be applied to wireless links associated with BTS systems providing the wireless link. The context aware radio resource management system link ratings may provide for optimized wireless links for connection by a user wireless communication device via a wireless network according to an embodiment of the present disclosure. The context aware radio resource management system including a concurrent wireless link optimization system may be implemented in connection with an RF band local QoS advertising system to prepare a RF band local QoS report for broadcast to assist a mobile information handling system in selecting a network and technology within a wireless network for a given location.

In some example embodiments, a concurrent wireless link optimization system may be used to eliminate wireless links (e.g., wireless link pairs in concurrent operation) or to adjust down the ranking of wireless links likely subject to high interference or collision for consideration by the context aware radio resource management system during selecting one or more optimal wireless links. The context aware radio resource management system including a concurrent wireless link optimization system selects a plurality of wireless links for concurrent operation on a mobile information handling system wireless communication device when concurrent links are to be used.

Association of the wireless links may be made with BTS systems providing those wireless links. Accordingly, the link ratings in view QoS and other factors described herein may also apply to BTS ratings. QoS information as well as weighted ratings involving cost, power consumption, usage, or other factors may also impact the rating of the BTS systems serving the wireless link rated by the context aware radio resource management system.

A wireless communication device in a wireless neighborhood in an embodiment may be a device having local wireless capability in unlicensed shared communication bands as well as carrier wireless capability on licensed wireless communication bands. The wireless communication device in an embodiment may be a device with a plurality of available wireless links including in a plurality of shared communication frequency bands as described in embodiments herein. The context aware radio resource management system may select wireless links from protocols in unlicensed communication bands or may select one or more wireless links in a licensed wireless communication band. In an example case, a licensed WWAN wireless link may be available in tandem with an unlicensed WWAN wireless link in a shared communication frequency band. In emerging 5G technology, the licensed WWAN wireless link may serve as an anchor link and have available supplemental bandwidth via an unlicensed WWAN wireless link. As described, this unlicensed WWAN wireless link has low cost and potentially high availability and QoS. Thus, BTS systems in unlicensed communication bands may receive higher ratings if acceptable QoS levels are met. The unlicensed WWAN wireless link may operate on a shared communication frequency band with other unlicensed wireless link protocols such as WLAN Wi-Fi. Similar additional concurrently operating wireless links may be available to the wireless device in other shared communication frequency bands. Accordingly, a concurrent wireless link optimization system may determine interference or collision risks from concurrently operating wireless link protocols in the shared communication frequency bands.

In one example embodiment, the context aware radio resource management system may determine a selection or list of optimized BTS wireless link options in a wireless neighborhood before the concurrent wireless link optimization system portion will determine local interference between concurrent wireless link pairs. Further, BTS level interference as between BTS systems of competing protocols in a wireless neighborhood may be assessed. In another example embodiment, the concurrent wireless link optimization system will determine interference between BTS systems operating concurrent wireless link pairs before assessing a list of optimized wireless link BTS systems for communication via the remaining operation of the context aware radio resource management system. It can be appreciated as well that determination of potential interference of concurrent wireless links at a user wireless communication device may also be assessed simultaneously with other factors of the context aware radio resource management system in affecting rankings of available wireless links in the wireless neighborhood.

In a particular embodiment, the concurrent wireless link optimization system may determine interference or same channel operation of competing protocols, such as two or more WLAN or small cell WWAN protocols, in a wireless neighborhood. The concurrent wireless link optimization system of the context aware radio resource management system may further determine what to do about a determined high level of interference or potential for collision. In one embodiment, the concurrent wireless link optimization system may opt to bar selection of same channel concurrent wireless link operation or adjacent channel concurrent wireless link operation from user wireless communication device. In the case of a mobile information handling system having a broad set of wireless link options, upon determination of a risk of interference or collision the context aware radio resource management system including a concurrent wireless link optimization system may select to shut down the shared wireless link option select a wireless link alternative for the wireless link protocol having the greatest number of options in different radio frequency bands. In the case of a mobile information handling system having an anchor licensed WWAN link with a supplementary unlicensed WWAN link in the shared frequency band, the context aware radio resource management system including a concurrent wireless link optimization system may select to shut down the unlicensed WWAN link option or other shared wireless link and default to the anchor licensed WWAN link for concurrent operation with the WLAN wireless link. In other aspects, the concurrent wireless link optimization system may opt to switch to a different channel given sufficiently good wireless quality and other factors for selecting a different channel in the shared frequency band for either the WLAN or an unlicensed WWAN links. In yet another aspect, the concurrent wireless link optimization system may allow same channel or adjacent channel concurrent wireless link operation but implement interference or collision mitigation to reduce the effects of anticipated interference.

As described, the context aware radio resource management system of the present disclosure may utilize crowd-sourced feedback on QoS for wireless network connections or various links operating at identified BTS systems within the wireless neighborhood. FIG. 6 shows an example embodiment of operation of the context aware radio resource management system including a concurrent wireless link optimization system in determining an optimized list of available BTS systems serving wireless links. An example context aware radio resource management system is disclosed in several patent applications and issued patents of the same assignee. Additionally, factors and wireless network data relating to the context aware radio resource management system may be utilized by the context aware radio resource management system including a concurrent wireless link optimization system in providing end-to-end scores and selection of preferred wireless communication paths between a mobile information handling system and a recipient.

Selection of two or more optimized wireless links for concurrent operation and connection to optimized BTS systems providing those wireless links may be made automatically by the context aware radio resource management system including a concurrent wireless link optimization system in some embodiments. In an embodiment, the selection by the context aware radio resource management system including a concurrent wireless link optimization system may be made with an override option available to a user. In yet another embodiment, the context aware radio resource management system including a concurrent wireless link optimization system may present BTS wireless link quality ratings to an RF band local QoS advertising system in some embodiments. Alternatively, the context aware radio resource management system including concurrent wireless link optimization may provide QoS data, cost data, power consumption data, and usage trend data to assist in determining optimal BTS systems in a wireless neighborhood for a communication type by a user mobile information handling system.

Several factors are assessed by the context aware radio resource management system including a concurrent wireless link optimization system and its coordination with an RF band local QoS advertising system in selecting BTS systems within various a radio technology protocols for preparing a RF band local QoS report for BTS systems in a wireless neighborhood. A software agent may be deployed at a wireless communication device or elsewhere in the network for executing the context aware radio resource management system including a concurrent wireless link optimization system and aspects of the context aware radio resource management system.

The context aware radio resource management system including a concurrent wireless link optimization system may further utilize the software agent to access wireless communication device usage trend data 610 in some aspects. The context aware radio resource management system including a concurrent wireless link optimization system may detect and learn patterns of usage by an individual user or recipient for particular wireless communication types. In an example embodiment, a preference score may be assigned to each as a percentage of time spent utilizing a particular wireless communication type or as a percentage of instances of using a particular wireless communication type. This data may be stored for a user or recipient in a wireless communication device usage trend database and shared across an enterprise or group via a context aware radio resource management system including a concurrent wireless link optimization system manager in certain aspects. The shared data may associate the wireless link at a BTS system with wireless service types and usage. In an example embodiment, wireless communication device usage trend data for a BTS may be recorded and is shown below in Table 1 for various devices accessing a BTS system. The data may be relevant to a particular time of day during which wireless access is sought.

TABLE 1

| Communication Type | User | Device | Usage Score |
|---|---|---|---|
| SMS Text | User A | Smart Phone | 20% |
| Video conference | User A | Smart Phone | 5% |
| Voice call | User A | Smart Phone | 30% |
| IM | User A | Smart Phone | 15% |
| Web/App data | User A | Smart Phone | 30% |
| SMS Text | User B | Notebook | 0% |
| Video conference | User B | Notebook | 15% |
| Voice call | User B | Notebook | 10% |
| IM | User B | Notebook | 20% |
| Web/App data | User B | Notebook | 65% |
| SMS Text | User C | Tablet | 0% |
| Voice call | User C | Tablet | 10% |
| Video conference | User C | Tablet | 20% |
| IM | User C | Tablet | 20% |
| Web/App data | User C | Tablet | 50% |

It is understood that the wireless communication device usage trend data may vary widely depending on data collection of a user's trends. The wireless communication device usage trend data may begin with certain default levels and be adjusted over time as usage data is collected for wireless communication types. It is noted that in the above example embodiment the usage preference scores sum to 100% for each wireless communication device type and user. The listing of data communication types may be further granulated in some embodiments and the above is a generalized example of user trend data gathered by data communication types. For each communication type event, the time or number of instances of the communication type with a wireless communication device is divided into total time or number of instances of all communication types for a user in the example embodiment. The above values are example data meant for the purposes of illustration and may relate to usage of particular BTS systems in a location. Further, this data may be specific to time of day or location and be available in spatial-temporal profiles of a user or of a mobile information handling system. Additional criteria may be implemented and may alter the scoring from adding to 100% depending on the scoring system used in other embodiments as is understood by those of skill.

The usage preference score may serve as a weighting factor for usage rating that may impact which wireless link quality ratings are used to determine an optimized list of BTS systems for providing wireless links or wireless communication paths and selection of preferred BTS systems for wireless links. The usage preference score is associated with the wireless communication device and communication type within a wireless neighborhood. An additional factor that may be added to the usage preference score is cost. In an embodiment, use of technologies with extremely low cost link options such as unlicensed communication band wireless links including Wi-Fi, small cell WWAN, or peer to peer protocols such as Wi-Fi Direct or Bluetooth Peer-to-Peer as a communication paths may increase usage preference scores due to low cost. Cost may also be considered as part of the wider list ranking of optimized wireless links available for the wireless communication devices. Other example alterations to usage preference scores are contemplated as well. These may shift the usage preference score of one or more available wireless communication devices. The shift may be by any amount. In one example embodiment, the expressed preference may shift the usage preference score for that wireless communication device by up to 50%. In another embodiment, a low cost option may shift a usage preference score by a similar amount if the wireless link QoS is sufficient. As understood, any shift in preference percentage or assigned weighting factor may be applied in the design of the context aware radio resource management system in various embodiments.

In another example embodiment, the context aware radio resource management system software agent obtains other user profile data that may also be utilized by the context aware radio resource management system including a concurrent wireless link optimization system that may shift user preference scores for wireless communication devices. Such user profile data may be included with the wireless communication device usage trend data 610 and may be used in connection with the context aware radio resource management system including a concurrent wireless link optimization system for tracking user trends for wireless communication types. In an example embodiment, the user profile data from the context aware radio resource management system may establish an approximate cyclostationary usage pattern of each wireless communication device on a daily or weekly basis. The time of day, location, types of usage, and usage percentages during a sample time interval are example factors included in the user profile data. This user profile data also may include a confidence of the estimate. This may be a statistical measurement of a mean and standard deviation for a set of data. Alternatively, the confidence of estimate may involve a goodness of fit metric to an expected set of values. Alternative statistical analysis may be performed on the user profile data to provide a confidence of the estimate. These cyclostationary usage patterns may used to shift weighting the preference scores in view of anticipated usage of BTS systems by wireless communication devices based on time of day and location or predicted location in a wireless neighborhood as described. The shifting of usage preference scores may be by any amount depending on several factors. Cost, expressed preference for wireless link, and other factors may shift user profile data that contributes to device usage trend data and weighting of BTS link ratings.

The context aware radio resource management system including a concurrent wireless link optimization system may also receive wireless link radio frequency traffic reports 620 and may be in accordance with time and location data for a user or recipient and their associated wireless communication devices. In an example embodiment, the wireless link radio frequency traffic reports 620 may be retrieved from the context aware radio resource management system. For location and time, available radio technologies and, where relevant, available service providers may be listed for a wireless communication neighborhood. The reports contain data relating to location, time and a radio frequency profile of given radio technologies for the available BTS systems in a wireless neighborhood. Certain radio technologies, such as those subject to concurrent wireless link operation, may be unlicensed and not require a service provider such as in the case of Wi-Fi/WLAN, unlicensed small cell WWAN, or similar wireless network connection options. These concurrent wireless links operate in unlicensed, shared spectrum as described and in some embodiments may be competing wireless link protocols in those shared spectrum. Small cell unlicensed WWAN wireless links may have a tandem licensed WWAN wireless link via a carrier communication bands in other example embodiments. For mobile information handling systems that are not standalone, carrier wireless link capabilities on licensed frequency bands may be available. For these devices, both licensed and unlicensed BTS wireless link options may be assessed. The context aware radio resource management system may provide link ratings, QoS data, usage data or other data to assist in providing rating for neighborhood BTS systems that are both licensed and unlicensed systems in various embodiments of the RF band local QoS advertisements.

The radio frequency profile data may also include an associated confidence of estimate for link ratings or QoS scores. The wireless link radio frequency profile may combine recent reports, historical traffic reports, as well as data measured via an active device radio frequency scan. In an example embodiment, to minimize wireless communication device battery power consumed, radio frequency broadband traffic reports from the network may only be requested or sent when a service provider network or a wireless communication device detects a significant change in signal quality or the network broker server detects that the local crowd source information is out of date.

The wireless link radio frequency traffic report for wireless links partially comprises a spatial-temporal radio frequency profile for the wireless links. The systems begins with a baseline report available from a context aware radio resource management system. The context aware radio resource management system may determine QoS metrics for various wireless links from crowd sourced data received from a plurality of wireless communication device operating within a wireless neighborhood on various BTS associated links. Data may include several factors of wireless QoS measured or sourced to the context aware radio resource management system.

Key performance indicators (KPI) comprise a spatial-temporal radio frequency profile. Data such as received signal strength (RSSI), signal-to-noise ratios (SNR), or signal to interference ratios (SIR) may be relevant channel quality indicators in a KPI matrix. Other data, may include data throughput speeds, communication latencies, jitter, and packet loss measurements. The context aware radio resource management system may actively assess the quality of wireless links from neighborhood BTS systems being used. One or more of these performance indicators may be used to compute a link rating associated with a BTS wireless link. Baseline reports rely on estimated values. For example using baseline estimated received signal strength indicators (RSSI), a link rating may be computed as follows in one embodiment:

Link Rating (i,j)=MAX (MIN (100%, (Estimated RSSI−Minimum Signal)/Max RSSI signal−Minimum RSSI signal, 0%), where i is a technology index and j is a wireless protocol index.

A maximum RSSI level may be defined in a technology protocol, for example as −70 dBm. The minimum RSSI level may be defined as well, for example at −110 dBm. RSSI is not the only key performance indicator that may be used to compute link ratings for BTS devices. Link rating may be based on different key performance indicator values besides received signal strength. Alternatively, multiple key performance indicator values may be used in the computation of a link rating.

In other examples of KPIs that may be used for link rating, link capacity and bit error rates (BER) may be measured. Bit error rate is the ratio of error bits to total bits sent across a wireless link. It is a metric illustrating a signal to noise ratio which can define the quality of a radio connection for a wireless link. A bit error rate may be a comparison of a sent test stream of data by a transmitter with what is received by a receiver. The bit error rate can be tested by a bit error rate tester in software which transmits a known bit pattern to or from the mobile information handling system. Pre-error correction errors are counted. A signal-to-interference ratio may also be measured. Such a measurement is based on the power levels for signal transmission (e.g., per bit) relative to interference levels in the received signal. Packet error rate, signal-to-noise measurement, or other signal quality testing is also contemplated. Data packets, such as test packets or active data, may be monitored as it is sent across wireless links to determine packet loss frequencies or resend occurrences for the packets.

A link rating matrix is established by available link protocols from neighborhood BTS systems and may be broken down by wireless technology, service provider, or both. In an example embodiment, for a matrix of [WLAN 2, WLAN 3, Small Cell WWAN, WiGig, ATT 4G, Verizon 4G], the baseline Link Rating (j) computation may result in (70%, 80%, 95%, 90%, 50%, 50%). 100% indicates best signal link quality and 0% indicates a signal quality below a minimum acceptable level. The context aware radio resource management system may use the link rating scores to evaluate the optimal wireless service providers and available protocols for the anticipated usages for a wireless link that comprises a portion of an end-to-end wireless communication path. Thus, the link rating protocol matrix can assist in selecting both wireless link BTSs in a neighborhood or a service provider with the best scores.

The context aware radio resource management system responding to a request from a hub BTS system in a wireless neighborhood may scan for wireless link radio frequency traffic reports fitting a time and location zone for operation. In an example embodiment, the zone of operation may be the wireless neighborhood as described above or a range of wireless connectivity for the hub BTS system. Wireless link radio frequency traffic reports may be retrieved from a central server database in the wireless networks. Alternatively they may be located elsewhere in a database such as at a network broker server system. The baseline report may be supplemented or superseded by any fresh or historical mobile traffic reports to assist in determining optimal wireless links. Recent or historic radio frequency profiles for time period and location zone may be used to update or supplement the wireless link radio frequency traffic reports. For example, a hub BTS system may scan a wireless neighborhood for BTS systems and determine current load conditions and report that information the context aware radio frequency management system. More recent data may be of greater relevance. For example, the link ratings in a radio frequency profile may utilize recently measured RSSI values or load values instead of estimated values from older historical performance.

Wireless link radio frequency traffic reports are aggregated via crowd sourcing. They may be categorized by location zone and have time and date stamps to identify freshness. Crowd sourcing of information will enhance the availability of accurate data for location zones and times of wireless communication device operation. For example, if a hub BTS system makes a request for a fresh wireless link radio frequency traffic report, the central server database may have reports from other wireless communication devices with recent timestamps. Alternatively, the central server database may make a request for a recent wireless link radio frequency traffic report from wireless communication devices or BTS systems in the same location. Whether via recent storage in the central database or via a recent request of fresh crowd sourced wireless link radio frequency traffic reports, such a report may avoid the need for the mobile wireless communication device entering a wireless neighborhood to conduct a radio frequency scan itself.

Crowd sourcing wireless link radio frequency traffic reports for locations and times provides a higher chance that a current wireless link radio frequency traffic report for a location is available. It also increases the available data points providing greater certainty and reliability of data. Part of the benefit of crowd sourcing may also involve performing a hysteresis analysis on the data coming from multiple wireless communication devices to determine trends in wireless link selection. When a wireless link on a BTS system is reported having low traffic and good radio frequency conditions, traffic from systems using the context aware radio resource management system will elect that wireless link. If a large part of the crowd of wireless communication devices begins to pile onto whichever wireless link BTS is reported to have the best available bandwidth, then that BTS system will slow down and underperform. The wireless link radio frequency traffic reports account for this by conducting a hysteresis analysis. If a large number of users begin to select this wireless link, then the method for generating wireless link radio frequency traffic reports accounts for this traffic and alters the recommended wireless links. For example, a second best option may be recommended as optimal for traffic and radio frequency conditions instead. Each crowd sourced wireless link radio frequency traffic report identifies its selected BTS system. A count of these selections can be compared to a threshold rate level of selections for a given BTS wireless link. If the rate of selections exceeds the threshold for a link, then the recommendation may be altered.

If there are not enough reliable historical wireless link radio frequency traffic reports recent enough to base a wireless link assessment upon, the context aware radio resource management system may initiate a wireless communication device radio frequency scan from a wireless communication device operating in a wireless neighborhood. This scan collects data regarding possible wireless links. This radio frequency scan consumes power and processor resources so should be used sparingly, however it provides up-to-date key performance indicators (KPI) for a new radio frequency profile to be used in a wireless link radio frequency traffic report. Based upon this new wireless link radio frequency traffic report, the system provides a wireless link performance profile to be used by the context aware radio resource management system.

The scan or test of radio frequency links may be conducted by the context aware radio resource management system. As a first measure, received signal strength and bandwidth availability for a service provider and a protocol are determined. Then a test of radio frequency data capacity is made. This can test upload and download performance for each service provider and protocol. For example, a standard test data volume may be sent via a wireless link to a server location at the service provider. Similarly, a test data volume may be received from a server location by the wireless communication device via the wireless link. Latency of response, upload and download speed or throughput can then be measured for the service provider and protocol. The data is associated with a location zone and stamped with a time and date. The type of transmitter/receiver or wireless communication device may also be recorded. This data set provides a wireless link radio frequency profile that may become part of a wireless link radio frequency traffic report. Upon measuring this data for a location, the report may be shared or published by the context aware radio resource management system from the mobile information handling system.

In one embodiment, the wireless link assessment may be used by the context aware radio resource management system including a concurrent wireless link optimization system to determine a ranked list of available BTS systems operating wireless communication links within a wireless neighborhood. Further assessment may include determining a ranked list of available wireless communication links for communication along a wireless communication path between two points across the wireless communication network, including various steps or hops across links within the wireless communication network. Using user profile reports and radio frequency link reports, each BTS or wireless communication link may be given an overall rank.

For a ranking of wireless communication path end-to-end, several methods may be used to determine wireless communication path overall quality score. In one example embodiment, it may be assumed the wireless communication path is only as good as the lowest link rating score along that path. Thus, the wireless communication path rating may be determined as the same as the minimum link rating in the communication path. In another embodiment, the wireless communication path rating may take into account the diminished quality of each wireless link in the communication path that is rated at less than 100%, or a perfect rating for a link. Thus a calculation whereby the effect of each wireless link rating less than 100% determines some diminishment on the overall wireless communication path rating. In an example embodiment, the wireless communication path rating may be determined as a product of a wireless link rating of the connecting link for the user wireless communication device with the wireless link rating of the connecting link for the recipient wireless communication device as follows:

Wireless Communication Path Rating($j$)=(Link Rating for Link from Wireless Device $A$*Link Rating for Link from Wireless Device $B$), where $j$=communication path index.

For a wireless communication path=[AT&T® 3G for Device A, Verizon® 4G for Device B], an example user Wireless Communication Path Rating (j) calculation may result as follows, (90%*70%)=63%. Each wireless communication path for a user wireless communication device and a recipient can be ranked by this score. Each Link Rating used to determine the Wireless Communication Path Rating shows a quality of service score by protocol for a BTS system along a wireless link at a location and time. For a given communication path, the Wireless Communication Path Rating may serve as an initial end-to-end quality rating upon which selection of a wireless communication path may be made. The Wireless Communication Path Rating may also include additional wireless links and Link Ratings for those links along the path. Additional weighting factors may apply to the initial end-to-end quality rating to yield modified end-to-end ratings for wireless communication links for selection of wireless communication paths and user and recipient wireless communication devices. This is described further below. The above values serve only as an example for purposes of discussion.

In another aspect, energy link reports 640 may be received as a variation of the wireless link radio frequency broadband traffic reports 620. These energy link reports 640 contain data relating to time, location and radio frequency profile information similar to the radio frequency broadband traffic reports. In addition, measurements of energy consumed during use of a specified wireless link from a BTS for a specified wireless service type is reported. The energy link data profile matrix can provide more detailed information above the mobile broadband radio frequency traffic reports. In this embodiment, the context aware radio resource management system prepares and delivers an energy link consumption report. The energy link consumption report provides data on power consumed by a wireless communication device while performing certain tasks on a wireless link from a BTS at a location. Energy link consumption reports contain data indicating how many joules of energy are consumed during sending SMTP emails, sending SMS messages, conducting voice communications, video conferencing, IM, accessing internet services, streaming audio or video, or other uses of mobile information handling systems. This data amounts to another key performance indicator (KPI) in addition to capacity or link quality data for a wireless link. The context aware radio resource management system can measure and utilize some or all data such as link capacity, link quality, and energy consumption in determining preferred BTS wireless links. Link ratings may be calculated similarly to the above description using the additional link energy consumption data. As with other input factors, a confidence of estimate associated with this data may be included. The energy link report data 640 may combine recent energy link profiles, historical energy link reports, and measurements through wireless communication device scans during operation.

The context aware radio resource management system including a concurrent wireless link optimization system may access battery power level data 630 for user wireless communication devices. In an example embodiment, the context aware radio resource management system including a concurrent wireless link optimization system may access the battery power level data 630 via the context aware radio resource management system which receives battery power level data from an intelligent battery management system of the wireless communication devices in the system. The battery power level input may establish thresholds for certain wireless communication protocols as being too costly in terms of power based on the remaining battery power available. Below a defined battery level threshold, the context aware radio resource management system may disable the most advanced protocols to save energy. For example, with only 10% battery power remaining, the context aware system may recommend to a user to disable high power consuming protocols such as 4G or 5G. The option may be given to the user, or automatic shut down of the radio frequency subsystem may take place. In a further example, the context aware system may recommend or shut down 3.5G at 5% remaining battery power. Any threshold levels may be set to trigger recommended shut down. In such a shut down, that wireless link rating will be at 0% or disconnected and impact the communication path overall ratings and the wireless communication device rating by the context aware radio resource management system including a concurrent wireless link optimization system of the present disclosure.

The context aware radio resource management system including a concurrent wireless link optimization system accesses the wireless communication device usage trend data 610 and receives the wireless link radio frequency broadband traffic reports 620, battery power level data 630, and in some energy link reports 640.

Turning to 650, the context aware radio resource management system including a concurrent wireless link optimization system determines wireless communication link scores for available wireless links within the wireless neighborhood. In some embodiments, end-to-end scores for available wireless communication paths between available user wireless communication devices and available recipient wireless communication devices are generated at 650. The context aware radio resource management system may provide link ratings for wireless links associated with BTS systems in a wireless neighborhood to the RF load local QoS advertisement system in some embodiments. The context aware radio resource management system including a concurrent wireless link optimization system may determine a list of ranked wireless links available within a wireless neighborhood in some embodiments. In other embodiments, the context aware radio resource management system including a concurrent wireless link optimization system may establish a plurality of available wireless links that meet a minimum sufficient level of criteria of QoS, power consumption, cost, or other factors in view of contextual usage of the wireless communication device.

The above data and inputs may be assessed by the context aware radio resource management system including a concurrent wireless link optimization system determine one or more optimized wireless communication links and link ratings an RF load local QoS advertisement system at a hub BTS at 650. The RF load local QoS advertisement system may then broadcast RF load local QoS reports to mobile information handling systems in a wireless neighborhood. In an example embodiment, one or more optimized wireless links may be determined at a location in either one or more unlicensed communication frequency bands, licensed communication frequency bands, or a combination of both. In a further aspect, a plurality of wireless link options are determined for concurrent operation to enable greater communication bandwidth and reliability for mobile information handling systems capable of concurrent wireless link operation. In some embodiments, the plurality of optimized wireless links best suited for a data usage may result in one or more operating wireless links from an unlicensed, shared communication frequency band. With respect to the cost factor in particular, an unlicensed, shared communication frequency band selection may result from the analysis of the context aware radio resource management system. Further, WLAN and small cell WWAN wireless links in unlicensed bands, for example, may be available and have good wireless QoS due to proximity and availability of a local wireless neighborhood in some aspects of the present embodiments. The RF load local QoS advertisement system may provide for broadcast assessment of these competing protocols from a shared communication band available in the wireless neighborhood. Such an advertisement of RF load local QoS reports for these competing wireless protocols may reduce processing or communications needed by a mobile information handling system entering a wireless neighborhood during selection of a wireless link.

In one aspect, the above data and inputs may be assessed by the context aware radio resource management system including a concurrent wireless link optimization system determine one or more preferred wireless communication end-to-end paths for a user wireless communication device at 650. In an example embodiment, the end-to-end rating for wireless communication paths begins by selection of a user wireless communication device (Device A) and a recipient wireless communication device (Device B). This end-to-end rating may include use of a plurality of concurrent wireless links.

In determining optimal wireless links, scanning assessment may be made of available wireless communication options for communication between Device A and Device B. If a low cost connection such as Bluetooth Peer to Peer, WLAN, Small Cell WWAN, or Wi-Fi Direct options are available and have sufficient capacity and signal quality, such a selection may be made. However, such wireless connections may also be included in the context aware radio resource management system including a concurrent wireless link optimization system assessment of all end-to-end communication paths with multiple wireless path links. Assessment of communication paths between user wireless communication device (Device A) and a recipient wireless communication device (Device B) will include additional available network path options on various communication technologies and may include concurrently operating wireless links for use in shared communication frequency bands. The context aware radio resource management system including a concurrent wireless link optimization system estimates an end-to-end link quality score for each wireless connection path between Device A and Device B as described above. In an example embodiment, the context aware radio resource management system including a concurrent wireless link optimization system may access the context aware radio resource management system to determine the wireless Link Ratings from Device A to an available network and Link Ratings from a back-end wireless network to Device B. Link Ratings may also be determined for any number of intermediate hops or links along the wireless communication path being assessed. Link Ratings may further be assessed for the wireless links for connecting to a mobile information handling system on one side of the communication path such as just for Device A. The Link Ratings may be determined from wireless link radio frequency broadband traffic reports 620 as discussed above. An end-to-end quality score is estimated from the above Link Ratings for one or more alternative service providers and technologies for wireless communication paths between Device A and Device B. Additionally, the end-to-end quality scores for wireless communication paths are similarly estimated between one or more user wireless communication devices and one or more recipient wireless communication devices. An aggregation of end-to-end quality scores involving a user wireless communication device may indicate an initial assessment of a preferred user wireless communication device before usage trends for communication types are assessed. For example, the Link Rating for wireless link connection between Device A and a wireless network technology may be combined with the Link Rating for the connection between Device B and the same or different wireless technology that form the end-to-end wireless communication path between Device A and Device B. For wireless communication paths with multiple wireless hops or links, the product of the plurality of the Link Ratings may be used to arrive at an initial end-to-end quality score for the end-to-end wireless communication path. In another embodiment, the lowest Link Rating of among the wireless links in the end-to-end wireless communication path may be adopted as the end-to-end quality score. It is understood that the wireless communication path may span across multiple service providers or wireless technologies.

Similarly, preferred recipient wireless communication devices may be initially assessed as preferred based on estimated end-to-end quality scores associated with that wireless communication device. As is discussed further, the initial end-to-end estimated quality scores are modified by battery power data and by user preference data to yield final end-to-end ratings. Other modifications to end-to-end ratings may also be implemented. The context aware radio resource management system including a concurrent wireless link optimization system may present an advisory graphical user interface including final end-to-end quality ratings to provide a user an informed choice of optimal wireless communication devices and an optimal wireless communication path for communication via a communication type between a user and a recipient as explained. The end-to-end quality ratings may include the final end-to-end scores or scores for individual wireless devices. In other embodiments, the advisory graphical user interface including end-to-end quality ratings may include a more qualitative rating for wireless devices, providers, or technologies for wireless communication paths between a user and a recipient. In an example embodiment, an end-to-end quality rating such as "good," "better," or "best" may be used. Each qualitative end-to-end rating may be assigned a end-to-end quality score range in an example implementation. It is understood that other qualitative indicators are also contemplated for use with the an advisory graphical user interface including final end-to-end quality ratings.

In an example embodiment, battery power levels 630 for wireless communication devices may be applied to initial end-to-end quality estimations to yield updated end-to-end quality rating for wireless communication paths. Such a battery power level may be applied as a multiplier weighting factor to the initial end-to-end quality estimations. In an embodiment, the new adjusted end-to-end score=Initial end-to-end quality estimation*Power weight score (Device A)*Power weight score (Device B). The power weighting score is assigned as a percentage. For example, above a threshold battery power level for a device (e.g., 40%), the power weight score may be set at 100%. Below the threshold battery power level, the power weight score decreases to 0% for a device power level at a second lower threshold power level (e.g., 5%). It is understood that any threshold levels may be used in establishing the power weighting score index with reported battery power levels for the wireless communication device. In a further example, the power weight score of 100% may be assigned for device power levels above 50% battery capacity remaining. The power weight score index line may linearly drop 100% to zero for device power levels between 50% and 10%. It is understood that any power weight score index curve relating to the device power level may be applied. Further, for a wireless communication path involving multiple hops and devices, a power weight score may be applied for each device along the wireless communication path if applicable. The above power weighting may also be applied only to each single wireless link option for connection by a mobile information handling system. If mobile information handling system is Device A for example, power weighted link rating may new adjusted wireless link rating score=Initial wireless link rating score*Power weight score (Device A). This rating may be assessed on a link by link basis for available wireless links for a mobile information handling system such as Device A.

In yet another embodiment, the battery power levels and user preference scores may be applied to alter the initial end-to-end quality estimation scores. In an example embodiment, the new adjusted end-to-end score=Initial end-to-end quality estimation*Preference score (Device A, Communication type, Cost)*Power weight score (Device A)*Preference score (Device A, Communication type, Cost)*Power weight score (Device B). For a single link rating this may be applied as new adjusted wireless link rating score=Initial wireless link rating*Preference score (Device A, Communication type, Cost)*Power weight score (Device A). Such an adjusted link rating may be applied for each available wireless link to a single mobile information handling system in example embodiments.

The assessments described above for end-to-end quality estimation scores may be applied on one side only, for example for Device A or Device B only, to determine link ratings for those devices on one side only in some embodiments as described above. It is understood that the wireless link rating assessments with respect to only one device, such as Device A, may yield a list of wireless link ratings for that mobile information handling system according to embodiments herein. In some aspects, data for a recipient wireless communication device, such as Device B, may not be relevant if data is accessed on a server or other hardwired network device or such data may not be available for a recipient device. In other aspects, implementation of assessment of the entire end-to-end path including the recipient device may not be desired. In such example embodiments, assessment may be made according to the above examples for a single mobile information handling system to rate wireless links available to that mobile information handling system and may omit the end-to-end aspects of the above weighting. For example, the weighting factors discussed above may only be applied to wireless links interfacing with Device A and not applied to the end-to-end communication paths in some example embodiments. It is understood that wireless links with a neighborhood BTS may be what is useful to a mobile information handling system first entering a wireless neighborhood rather than anticipation of end-to-end path determination according to some embodiments. For example, broadcasts according to RF load local QoS advertisement system may not consider end-to-end links ratings when broadcasting data about BTS systems in the nearby wireless neighborhood.

Proceeding to 655, the context aware radio resource management system including a concurrent wireless link optimization system will assess the available optimized wireless link options for local interference. In an embodiment, the wireless communication device may concurrently operate two or more wireless links to increase bandwidth or for additional wireless link availability. As described herein, that concurrent operation of two or more wireless links may arise in shared radiofrequency communication bands in some embodiments. For example, concurrent wireless links may operate in the unlicensed U-NII band which may be shared by WLAN/Wi-Fi and emerging 5G small cell WWAN systems. In other example embodiments, a shared communication frequency band may accommodate several LPWAN protocols as in embodiments herein. With competing wireless link protocols operating concurrently on shared communication frequency bands, interference may arise due to BTS transceivers operating on the same channels or adjacent channels within these shared communication frequency bands. For example, wireless neighborhoods such as depicted in FIG. 3 may be set up without particular determination of channels that each BTS transceiver operates on.

Thus, a wireless communication device communicating concurrently with multiple transceivers, from a shared antenna in some embodiments, may encounter interference from operating on adjacent channels or even the same channel within the shared communication frequency band. The context aware radio resource management system includes a concurrent wireless link optimization system to determine if available wireless link pairs may be such that they would concurrently operate on adjacent or even the same channel in a shared communication band. The concurrent wireless link optimization system will receive data relating to neighborhood BTS lists for various available concurrent wireless links. If BTS systems in a wireless link neighborhood from competing wireless link protocols operate on a same channel or adjacent channel, the RF load local QoS advertisement system may advertise aspects of whether such BTS systems may cause interference to mobile information handling systems attempting to operate on competing protocols concurrently in an example embodiment.

Based on the channels occupied by potential wireless links pairs, an assessment may be made of collision or interference potential. The interference may be based on modeled interference from adjacent channel operation or may be measured by the concurrent wireless link optimization system through the network interface subsystem. In response to determination of potential significant interference or risk of collision, some concurrent wireless link pairs may be eliminated from consideration among a list of ranked wireless links available within a wireless neighborhood in some embodiments that meet a minimum sufficient level of criteria of QoS, power consumption, cost, or other factors in view of contextual usage of the wireless communication device. In other embodiments, the concurrent wireless link optimization system may impact the ranking of potential concurrent wireless pairs from the determined risk of collision risk or interference due to concurrent operation at a wireless communication device.

In some aspects, which may be encountered within the context of a wireless communication device that has both licensed and unlicensed wireless communication options, the context aware radio resource management system may determine to not concurrently operate transceivers in the shared communication frequency band, for example, to entirely avoid data collision. For example, the mobile information handling system switch off an unlicensed WWAN wireless link option and leave only an anchor WWAN wireless link option via a service provider. In such a situation, that risk of collision or significant interference may result in an election not to operate concurrent wireless links in the shared communication band or to prohibit selection of a pair of concurrent wireless links that operate on the same channel.

As yet another aspect, the concurrent wireless link optimization system may deploy interference or collision mitigation to minimize or avoid potential collision or interference for a selected pair of wireless links. For example, interference mitigation may include applying adaptive bandpass filtering or data transceiver scheduling for concurrently operating pairs of wireless links that may operate on the same or adjacent channels in the same frequency band if such wireless link pairs are to be selected for concurrent operation.

Other aspects of interference may be assessed as well at 655. In addition to interference at a mobile information handling system due to concurrent wireless links operating there, interference may be experienced at BTSs in the wireless neighborhood. Interference at the BTSs includes interference from other APs and small cell transceiver substations. BTS interference may occur due to deployment of several protocols within a shared communication frequency band. BTS interference may further depend in part on proximity of BTS devices transmitting within a shared communication frequency band. Assessment of this interference may be determined or modeled and impact the selection of concurrent wireless links operating if operating within a shared communication frequency band. In an example embodiment, total risk of interference or collisions due to concurrently operating wireless links may be assessed at the mobile information handling system as well as at the selected BTSs at 655 to determine or optimize concurrent wireless links. Such interference may be reported by a hub BTS system via the RF load local QoS advertisement system.

At 660, the context aware radio resource management system including a concurrent wireless link optimization system may select one or more preferred wireless communication links or paths based on comparison of the optimized wireless link rating scores including adjustments made due to the interference or collision assessment made via the concurrent wireless link optimization system. The context aware radio resource management system including a concurrent wireless link optimization system assesses usage trends, interference of concurrently operating protocols on shared communication frequency bands, RF traffic reports, battery power levels, energy link reports, and additional factors, such as subscriber cost of wireless link usage, to establish wireless link or end-to-end wireless path ratings. As with other factors, subscriber cost or settings may influence the determination by weighting protocol options and influence the scoring described above. In an example embodiment, it may be used as a multiplier or other weighting factor in determining end-to-end ratings or scores for wireless communication paths. Alternatively, settings or subscriber cost may be used to mask out protocol options altogether. For example, cost or battery energy power levels may mask out protocol options or wireless communication devices in some embodiments. Due to these factors of cost as well as power consumption, it may arise that a plurality of wireless links may be selected from the available WLAN and small-cell WWAN options in a wireless neighborhood. In some embodiments, these WLAN and small cell WWAN links are often available at no cost, and their close proximity yields lower connection requirements and transmission power costs. Based on one or more of the above-outlined aspects, the context aware radio resource management system including a concurrent wireless link optimization system selects a plurality of available wireless links while avoiding local interference or implementing interference mitigation due to operation on same or adjacent channels within the unlicensed, shared radiofrequency communication bands used with WLAN and WWAN. These selected wireless links are associated with their respective BTS systems in the wireless neighborhood. Upon combination with locally assessed BTS system data in a wireless neighborhood by the RF load local QoS advertisement system, a recommendation of wireless links may be made. The RF load local QoS reports may reflect recommended BTS wireless links advertised to newly arriving mobile information handling systems At 670, the context aware radio resource management system including a concurrent wireless link optimization system may utilize a software agent operating at a mobile information handling system to initiate communication of the selected communication type on a selected wireless link or on concurrent wireless links. In some aspects, the context aware radio resource management system agent operating at the mobile information handling system may conduct additional link rating assessments, such as for anticipated usages by the mobile information handling system to determine a wireless link or concurrent wireless links. For example, types of communication may be commenced along a preferred wireless communication path between a user wireless communication device and a recipient wireless communication device in an embodiment of the present disclosure. In doing so, preferences of wireless communication device based on usage trends for a wireless communication type are taken into account in selecting one or more wireless links to conduct the communication. This is done in accordance with determining the preferred wireless communication links while minimizing interference or collision risk during concurrent operation by the user wireless communication device.

The request is made for access to the selected network to establish the wireless communication link. In some embodiments, the mobile information handling system operating concurrent wireless links may establish connection to each of a selection of unlicensed wireless links in a shared communication frequency band. For example, connection may be made with a WLAN AP and with a small cell WWAN substation including exchange of any necessary access information. In another embodiment, the radio frequency subsystems of a wireless adapter may contain individual subscriber identity module (SIM) profiles for each technology service provider and their available protocols as well as a wireless access system for WLAN and similar wireless connections for any wireless links that are subscriber specific. The radio frequency subsystems may have an application processor or controller for the wireless adapter capable of switching between SIM profiles or WLAN or similar wireless network connections at the wireless communication device. Thus, a wireless link recommendation from a context aware radio resource management system including a concurrent wireless link optimization system and a context aware radio resource management system would not need to be transmitted to network broker server system, but may be selected with a SIM profile for a recommended service provider and protocol and seek direct access. Alternatively it could be submitted to a network broker server systems such as an MVNO. Nonetheless, billing and other coordination of SIM profile options may be managed by a broker such as an MVNO. The context aware radio resource management system including a concurrent wireless link optimization system and context aware radio resource management system is described further below.

Figure 7:
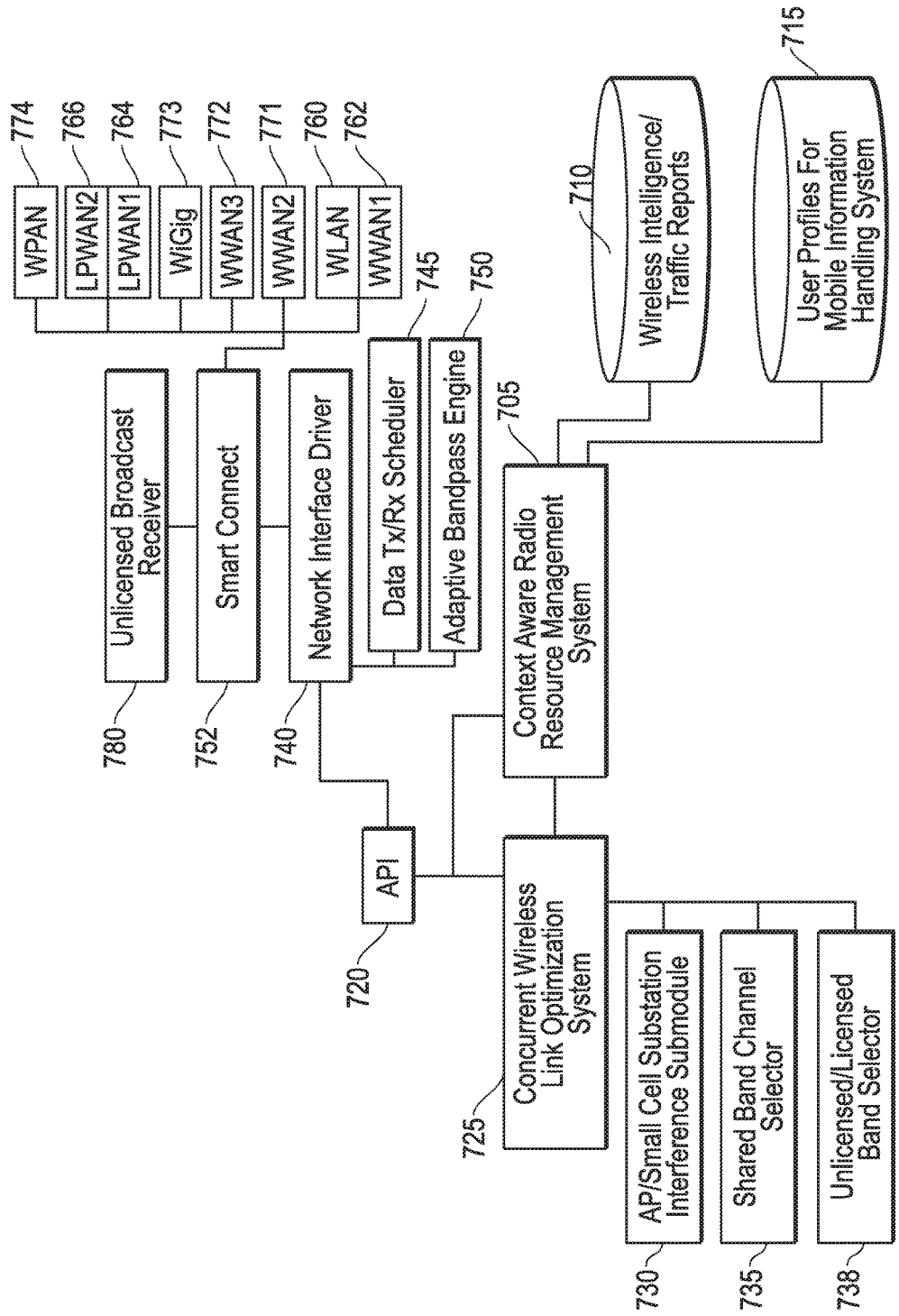
FIG. 7 is a block diagram illustrating a mobile information handling system implementing a an RF band local QoS report and a context aware radio resource management system according to an embodiment of the present disclosure.

FIG. 7 illustrates the context aware radio resource management system including a concurrent wireless link optimization system according to several embodiments of the present disclosure. The context aware radio resource management system 705 includes a concurrent wireless link optimization system 725 that works in connection with and may be part of the context aware radio resource management system 705. Some aspects of the context aware radio resource management system 705 are described in several embodiments in U.S. Pat. Nos. 9,088,859, 9,119,039, 9,210,714, 9,167,591 as well as several applications to the same assignee and incorporated herein by reference. The context aware radio resource management system 705 with the concurrent wireless link optimization system 725 may reside on a remote data center or may reside on a user information handling system. Portions may reside on the mobile information handling systems which seek to potentially access a plurality of concurrent wireless links. For example the concurrent wireless link optimization system 725 with aspects of the context aware radio resource management system 705 may operate within a software agent residing at the wireless communication device. Other portions of the context aware radio resource management system 705 may operate at a remote data center or a server located elsewhere.

The context aware radio resource management system 705 may have access to databases including wireless intelligence reports and traffic reports 710. Additional variations of databases available to the context aware radio resource management system 705 are discussed above and may include energy link reports, wireless link cost data and the like. Further, context aware radio resource management system 705 may also have access to user profiles 715 for the mobile information handling systems that operate as the wireless communication devices. Again, additional data may be available to the context aware radio resource management system 705 including battery power level readings, measurements of real time radio frequency QoS factors among other factors described herein or understood by those of skill.

Additionally, in embodiments herein, the context aware radio resource management system may operate on a mobile information handling system and receive RF band local QoS reports containing wireless neighborhood BTS options, up to date BTS load data, and link ratings and optimal wireless link determinations according to wireless link protocols or according to communication frequency bands. The RF band local QoS reports may have been generated by a RF band local QoS advertisement system at a hub BTS system. The RF band local QoS advertisement system may scan neighborhood BTS systems in a local assessment according to some aspects. In other aspects, the RF band local QoS advertisement system may access QoS data or link ratings from a centralized context aware radio resource management system at a remote, centralized location. This enables some of the analysis for the wireless neighborhood to take place remotely. A baseline assessment of optimal wireless links is delivered via the RF band local QoS reports to a mobile information handling system entering a wireless neighborhood via broadcast on an unlicensed channel as described in embodiments herein.

In a distributed system where code instructions may operate on several processors, context aware radio resource management system 705 may work with components and modules via an application programming interface (API) 720 as understood by those of skill in the art. For example, coordination of code instruction modules may coordinate operation via API 720 as between the context aware radio resource management system 705 and code portions such as the concurrent wireless link optimization system 725. API 720 may further facilitate coordinated operation with a network interface driver 740, where appropriate, in a wireless communication device such as a mobile information handling system of the types described herein.

The context aware radio resource management system 705 with the concurrent wireless link optimization system 725 may include a competing link protocol interference module 730 executing code instructions to determine channels and interference levels from concurrently operating wireless link pairs in a wireless neighborhood. For example competing link protocol interference module 730 may determine interference that may occur between APs and small cell WWAN substations in a wireless neighborhood for a shared communication frequency band in some embodiments. In other embodiments, BTSs for other competing wireless link protocols in a shared communication band may assessed for interference such as competing LPWAN protocols including LoRaWAN, LTE-MTC, NarrowBand IoT, UNB, Sigfox, or Haystack as examples that may operate within a shared communication band. A neighboring interference list may be generated by determining the channels on which detected APs and small cell WWAN wireless links are operating in an example embodiment. In another example, neighboring interference list may be generated by determining the channels on which detected BTSs for LPWAN protocols are operating. Based on operation of the competing link protocol interference module 730, a determination of likely interference or potential collision due to adjacency of channels or same channel operation may be assessed. From such an assessment, determination may be made regarding whether to shut down one of the competing link protocols, whether to select a wireless protocol on a different band, whether to select a different available channel or whether to implement interference remediation. In one example embodiment, a wireless link may be shut down if it has a number of replacement wireless links on alternative communication frequency bands.

In some embodiments, a shared communication frequency band channel selector may be used to select a different wireless link option for concurrent operation of multiple wireless links at a wireless communication device such as a mobile information handling system. The shared band channel selector 735 may be implemented to determine a non-adjacent channel option for either of the one or more wireless protocols to be concurrently operating. The shared communication frequency band channel selector may further opt to select alternative channels for competing wireless links on a shared communication band. For example, for either the WLAN or small cell WWAN wireless link when a same channel occupancy is detected in some embodiments, one or the other may be moved to a different channel within the same shared frequency band if an alternative is available. In yet other embodiments, it may be desired to forgo all concurrent wireless link operation within the shared frequency band if the only choice is a same channel option or an adjacent channel option between two wireless links. In such a situation, the context aware radio resource management system may shut down the concurrent wireless link capability within the shared communication frequency band and select a channel for operation on a wireless link protocols in a different frequency band. As shown in several embodiments herein, several wireless link protocols may be available and a different band may be selected which supports the same protocol as one of the competing wireless links or an entirely different wireless link protocol may be selected in some embodiments. It is understood however that other options may be implemented as well including data scheduling or other collision or interference mitigation as described in embodiments herein. In some aspect, the mobile information handling system may seek to preserve concurrent wireless link capability to expand bandwidth or provide for backup wireless link options should a primary wireless link option become poorly connected or disconnected.

In some embodiments, a mobile information handling system may include both licensed and unlicensed wireless capabilities. For example, a mobile information handling system may have available an anchor licensed small cell WWAN capability as well as an unlicensed, supplemental small cell WWAN option. The unlicensed, supplemental WWAN option may operate in a shared communication frequency band as under the present disclosure and may provide for low-cost additional wireless bandwidth. In such an example embodiment, the concurrent wireless link optimization system 725 may be operatively connected to an unlicensed/licensed band selector 738. The unlicensed/licensed band selector 738 may be used to turn off a supplemental unlicensed WWAN wireless link when a high risk of collision or interference is determined. In doing so, a system with both licensed and unlicensed WWAN capability will default to the licensed WWAN option. The licensed WWAN option may then operate concurrently with a WLAN wireless link operating in the shared, unlicensed communication frequency band according to various embodiments herein.

Network interface driver 740 may be connected to a wireless network interface device smart connect system 752. In one aspect of the present disclosure, network interface driver 740 may access an unlicensed broadcast channel via front end circuitry 780 geared to receive broadcast channel information without need for authorization. In some embodiments, the network interface 740 may work with front end 780 to receive generic advertising services notice of available RF band local QoS reports from an advertising hub BTS. This generic advertising service may require a mobile information handling system to transmit a probe via front end 780 to receive the RF band local QoS reports in an embodiment. The operation of the generic advertising services may operate subject to IEEE 802.11u in some embodiments.

Wireless network interface 740 device may operate with a shared antenna or multiple antennas for transceiving data and communications via the concurrent wireless links. The wireless network interface device 740 may operate, in an example embodiment, with a WLAN radiofrequency front end 760 for transceiving wireless data via a WLAN wireless link such as Wi-Fi. In another example embodiment, emerging 5G systems may implement small cell WWAN operation (e.g., eNodeB operations) utilizing shared communication frequency spectrum. Accordingly, a wireless network interface device 740 may also operate with a WWAN radio frequency front end 762 for transmission and reception of wireless data and communication from a small cell WWAN wireless link. In an example embodiment, the small cell WWAN operation may have a tandem anchor licensed small cell WWAN radio, such as WWAN 2 771, in tandem with the supplemental small cell WWAN radio 762 that operates in the shared, unlicensed communication band.

Network interface driver 740 may also have available front end RF circuitry for radio operation in a plurality of additional wireless links. This may include additional small cell WWAN or macrocellular WWAN options such as WWAN 3 773. In some embodiments herein, a plurality LPWAN radio frequency front end RF circuitry for LPWAN radios may be implemented such as LPWAN 1 764 and LPWAN 2 766. Additional wireless link protocols that may be implemented by the pan-radio mobile information handling system to include one or more WiGig RF front ends and radios 773 and one or more WPAN protocol radios 774 such as Bluetooth, Zigbee, or similar WPAN wireless protocol.

The context aware radio resource management system 705 and concurrent wireless link optimization system 725 may select from among the multiple wireless communication protocols available to the mobile wireless information handling system. The context aware radio resource management system 705 and concurrent wireless link optimization system 725 may work with a smart connect system 752 for switching between activation of one or more wireless link radio protocols 760, 762, 764, 766, 771, 772, 773 and 774.

In an embodiment of the present disclosure, the context aware radio resource management system 705 and concurrent wireless link optimization system 725 will select for a plurality of wireless links operating concurrently to make available greater bandwidth and reliable data connection. The smart connect system 752 will determine activation, or turning off protocols not being used, based on determination of optimized wireless links. The context aware radio resource management system 705 and concurrent wireless link optimization system 725 will select two or more optimal wireless links for concurrent operation which may or may not operate on shared communication frequency bands depending on the result of the assessment. The smart connect system 752 will operate to utilize the concurrent wireless links optimized for QoS and to minimize interference as determined by the context aware radio resource management system 705 and concurrent wireless link optimization system 725.

In one example embodiment, the context aware radio resource management system 705 and concurrent wireless link optimization system 725 have the smart connect system 752 select to utilize or turn off unlicensed small cell WWAN wireless link availability for concurrent operation with the WLAN link. Selection to keep on or turn off the unlicensed small cell WWAN link may depend on assessed risk of collision or interference according to an example embodiment. In one embodiment, a licensed, small cell WWAN radio may operate via the same or a different antenna system according to embodiments herein and may operate on a different communication frequency band from the unlicensed, shared communication frequency band used by the WLAN wireless link.

Network interface driver 740 may include a processor or controller executing code instructions for an interference or collision remediation system according to embodiments of the present disclosure. In an example embodiment, network interface driver 740 may execute code instructions for a data transmission/receiver scheduler 745. In one embodiment, a memory for queuing data may reside with code instructions for scheduling data transmission as between concurrently operating wireless links in a shared communication frequency band. One or more memory devices may be available for queuing data for the plurality of concurrently operating wireless links. For example, a WLAN queue and a small cell WWAN queue may be made available for data transmission scheduling. A data reception scheduler may also be implemented in an embodiment. In some aspects, data reception may be scheduled by transmitting requests to queue data at a BTS transmitter to limit occupancy of a channel for the wireless link.

In another example embodiment, network interface driver 740 may execute code instructions for operation of an adaptive band-pass filter 750. In one embodiment, when adjacent channels are selected for concurrent operation of wireless links, the band-pass filter applied to delineate channels may be further programmable to provide sharper delineation between the adjacent channels. Such sharper application of band-pass filtering may be conducted according implementation of band-pass filter systems of higher order than are frequently used to delineate channels in a DSP of a network interface for a wireless link protocol. The adaptive band-pass filter will reduce noise bleed over between adjacent channels caused by roll of from the ends of a channel frequency range. The adaptive band-pass filter may be implemented according to embodiments herein and as band-pass filter operation is understood by those of skill in the art.

In another example embodiment, network interface driver 740 may execute code instructions for operation of an adaptive band-pass filter 750. In one embodiment, when adjacent channels are selected for concurrent operation of wireless links, the band-pass filter applied to delineate channels may be further programmable to provide sharper delineation between the adjacent channels. Such sharper application of band-pass filtering may be conducted according implementation of band-pass filter systems of higher order than are frequently used to delineate channels in a DSP of a network interface for a wireless link protocol. The adaptive band-pass filter will reduce noise bleed over between adjacent channels caused by roll of from the ends of a channel frequency range. The adaptive band-pass filter may be implemented according to embodiments herein and as band-pass filter operation is understood by those of skill in the art.

It is understood that the block diagram of FIG. 7 may include additional components and aspects that may not all be depicted for the context aware radio resource management system 705 including a concurrent wireless link optimization system 725. Additional aspects and components including various processors, memories, and busses may be utilized and the context aware radio resource management system 705 including a concurrent wireless link optimization system 725 may be a distributed system operating across multiple information handling systems according to some embodiments. Further, not all aspects of the context aware radio resource management system 705 including a concurrent wireless link optimization system 725 may be utilized in all embodiments.

Figure 8:
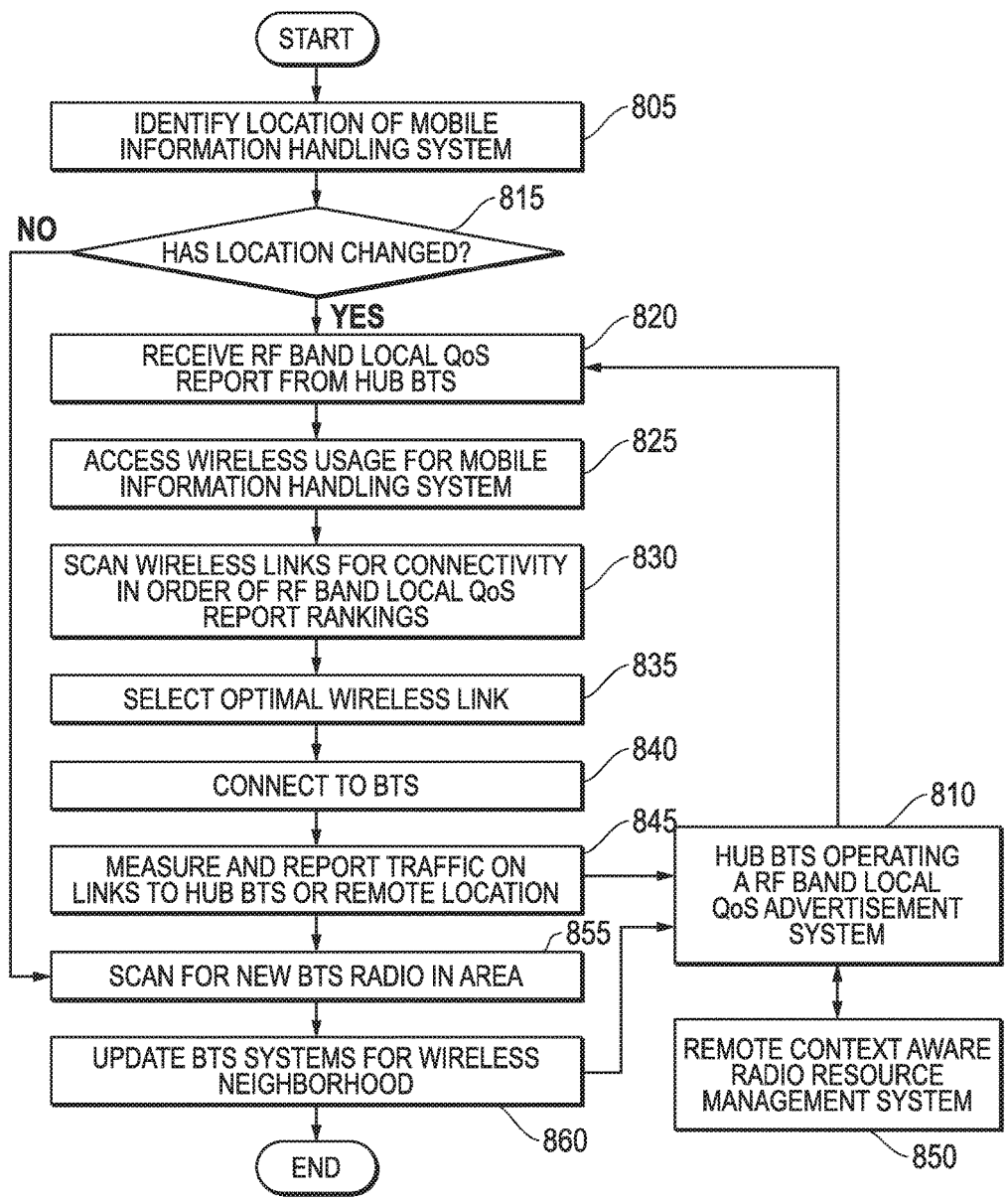
FIG. 8 is a flow diagram illustrating a method of determining a wireless link using a broadcast RF band local QoS report according to an embodiment of the present disclosure.

FIG. 8 illustrates a method of operation of a context aware radio resource management system on a mobile information handling system and utilizing received RF band local QoS report advertised from an hub BTS to a wireless neighborhood according to an embodiment. In this example embodiment, a mobile information handling system entering a wireless neighborhood may have a substantial selection of wireless links available. Some of those wireless links may be competing wireless link protocols operating on shared communication frequency bands. The mobile wireless communication device entering a wireless neighborhood may utilize one or more wireless links for data communication in a variety of wireless service usage types. Several wireless link protocols may be available. For example, WLAN and an unlicensed small cell WWAN wireless links within the shared, wireless communication band may be available through plural BTS systems in the wireless neighborhood. In another example embodiment, a plurality of LPWAN wireless links operating on the mobile information handling system in separate protocols may be available utilizing a shared, wireless communication band.

A hub BTS may operate an RF band local QoS advertisement system 810 with access to a centralized context aware radio resource management system 850 according to embodiments herein. The RF band local QoS advertisement system 810 may provide one or more RF band local QoS reports for available radio frequency bands in the wireless neighborhood to be broadcast to mobile information handling systems entering and seeking wireless link access to BTS systems in the wireless neighborhood. The RF band local QoS advertisement system 810 at a hub BTS may draw QoS or link rating data from the centralized context aware radio resource management system 850. The RF band local QoS advertisement system 810 may blend that QoS data or link rating data into RF band local QoS reports in accordance with embodiments described herein.

The method of FIG. 8 may be executed via code instructions for a context aware radio resource management system software agent or other portion of code operating on one or more processors or controllers at a mobile information handling system entering a wireless neighborhood.

The context aware radio resource management system on the mobile information handling system may commence at 805 by determining a location of the mobile information handling system. Identification of location may be established via a plurality of techniques known in the art including via use of a global positioning system (GPS) available to the mobile information handling system. For example, a global positioning system (GPS) may determine a longitude and latitude reading for the mobile information handling system entering the wireless neighborhood as understood by those of skill in the art. GPS may be available as a feature of the mobile information handling system. Additional location techniques may be network based via multilateration such as via interpolation of signals between base station signal antennas such as APs or signal towers and the mobile information handling system in some embodiments. An example may be triangulation via advanced forward link trilateration. Another example is utilization of Wi-Fi positioning system (WPS) for a mobile information handling system within a wireless neighborhood in other embodiments. WPS may utilize RSSI and fingerprinting via APs to locate relative position of a mobile information handling system within the wireless neighborhood. Mobile information handling system location systems determining signal strengths or cell location or an Enhanced Observed Time Difference (E-OTD) system may be used in yet other embodiments.

At 815, if that mobile information handling system location has changed since a previously recorded location, flow will proceed to 820 to determine the QoS and load characteristics of the new wireless neighborhood. Location may be recorded in a periodic fashion or may be recorded after periods of detected motion by the mobile information handling system. If no change in location has been determined at 815, flow may proceed to 855 to scan and determine if any new BTS radio systems have been added to the current wireless neighborhood.

Upon determination that a location change has occurred at 815, the mobile information handling system may determine if an unlicensed broadcast channel is available in the wireless neighborhood at 820. If an unlicensed broadcast channel is available, it may be made available on a select set of designated broadcast channels. Thus, the mobile information handling system will not need to scan a large selection of channels to determine the wireless neighborhood BTS options nor to find a broadcast advertisement channel. In one example embodiment, a designated wireless broadcast channel, such as a channel reserved under IEEE 802.11 Wi-Fi standards, may be used to broadcast the RF band local QoS reports by the hub BTS system on an unlicensed band. In an example embodiment, an unlicensed band at 2.4 GHz may be used to broadcast the RF band local QoS reports due to good wireless propagation range of that band. An entering mobile information handling system may receive the RF band local QoS reports via the broadcast channel on the unlicensed band without entering a required link access routine or requiring authorization to access the broadcast channel. Received data from the RF band local QoS advertisement system may be used to reduce computational or scanning burden on the mobile information handling system during selection of one or more BTS systems and respective wireless links among several available options for data communications. The mobile information handling system may listen on the unlicensed broadcast band for the RF band local QoS reports. In an example embodiment, the RF band local QoS advertisement system may broadcast the RF band local QoS reports periodically to any potential mobile information handling systems entering a wireless neighborhood. The periodic broadcast may take place with relative frequency to ensure newly arriving mobile information handling systems to a wireless neighborhood may have broadcast data readily available for the BTS system options operating in the wireless neighborhood.

In another particular embodiment, the broadcast channel may be a beacon system indicating to mobile information handling systems that RF band local QoS reports are available via unlicensed communication. For example, a generic advertising services (GAS) system such as available in Wi-Fi protocol under 802.11u and utilized on unlicensed frequency bands may provide for a beacon indicating network services behind a Wi-Fi AP system. A vendor specific option may indicate within this GAS beacon that a RF band local QoS report is available for one or more wireless link protocols. No authorization would be needed to access such a beacon. Upon receiving notice of the RF band local QoS reports available at a hub BTS system, the mobile information handling system may be prompted to transmit a probe request seeking additional information. Particularly, the mobile information handling system may request the RF band local QoS local report for conditions in the wireless neighborhood.

The context aware radio resource management system at the mobile information handling system may then receive the RF band local QoS reports from a hub BTS system 810. As described in embodiments herein, the RF band local QoS reports will have been generated by a the RF band local QoS advertisement system providing local scanned data identifying a plurality of BTS systems within a wireless neighborhood within range of a wireless adapter of the hub BTS system 810. The RF band local QoS reports may include identifying information and scanned load levels for BTS systems in the wireless neighborhood. The hub BTS or auxiliary hub BTS system may gather load information for neighborhood BTS systems in different bands as described.

In one embodiment, assessing activity on the channel by the neighborhood BTS systems over a period of time may provide a reading of BTS load occupancy for each BTS system operating on a wireless link in the channel. To conduct a measure of BTS load occupancy, the RF band local QoS advertisement system scanning function will listen to a channel over the period of time. The RF band local QoS advertisement system will record a percentage of time the channel is above the energy detected (ED) level during that listening period. The ED level can be set to a static value in some embodiments such as −62 dBm or set dynamically based on statistics for radio interference levels. In any event, the ED level is set to be above a noise floor level of the BTS system to detect activity on the channel. In an aspect, the RF band local QoS advertisement system may also determine which identified BTS systems are operating during the listening period to associate the load determinations with the neighborhood BTS systems. In such an embodiment, a local load may be established for BTS systems in the wireless neighborhood by the RF band local QoS advertisement system.

In another embodiment, some wireless protocols provide for a reporting system to make available active load reading for BTS systems operating within the wireless link protocol. For example, Wi-Fi systems in a WLAN may report BSS load under 802.11 determinations from a Wi-Fi BTS system such as an AP. This BSS load data may be accessed from a central data base or from the BTS system itself in various embodiments. In yet another embodiment, load reporting may be received by a context aware radio resource management system crowd sourced in accordance with embodiments herein. BTS load may be accessed by the RF band local QoS advertisement system from one or more sources such as those described above to determine load activity on BTS systems operating on the channel. This load data may be gathered by a hub BTS system for reporting within the RF band local QoS reports. Providing this data via broadcast reports will reduce the computational time and scanning time necessary by the mobile information handling system entering a wireless neighborhood to identify available wireless links for assessment.

Further, as described in some embodiments, the hub BTS operating an RF band local QoS advertisement system 810 may access to a centralized context aware radio resource management system 850 for QoS data and link ratings for the plurality of BTS systems operating in the wireless neighborhood and provide the same data in the RF band local QoS reports for the BTS systems. This may permit the mobile information handling system to avoid accessing the context aware radio resource management system externally for this information and the RF band local QoS advertisement system 810 may already blend this QoS data with up-to-date local information on data load characteristics of neighborhood BTS systems. The RF band local QoS reports received at 820 may also include BTS ratings in accordance with embodiments herein. In other embodiments, the received RF band local QoS reports at 820 may include recommended wireless links for certain protocols.

As described previously, the mobile information handling system may take the RF band local QoS reports and based on rankings or load and QoS information contained therein select an optimal wireless link. In other embodiments, the mobile information handling system may take the RF band local QoS reports as a baseline and add other factors into determining an optimal wireless link or wireless links to select.

In an example embodiment, flow may proceed to 825 to apply additional factors to the link ratings or QoS data received via the RF band local QoS reports. In the present embodiment, the context aware radio resource management system on the mobile information handling system will access its user profiles including historical records of wireless service usages. The wireless user profiles for the mobile information handling system may include aspects of wireless service usage history for a time or location. In other aspects, cyclostationary usage data may be accessed in accordance with the several embodiments. The context aware radio resource management system may determine one or more anticipated wireless service usage types that may predominate in the wireless neighborhood at that time. The anticipated wireless service type or types may be aligned with the RF band local QoS report data on link ratings corresponding with wireless service usage categories. In one embodiment, the highest rated wireless link or links for the anticipated wireless service may be selected. These wireless links may be selected in an aspect if the scanned loading on those BTS systems is below a certain threshold level.

In other embodiments, the received RF band local QoS reports including BTS loading and wireless link ratings for user wireless service categories may be included in a weighted determination of optimal wireless links as with embodiments described above. One or more optimal wireless links may be selected for connection to corresponding BTS systems within the wireless network. In some embodiments, cost or energy consumption may factor into the weighting of optimal wireless links and BTS systems within the neighborhood. User preferences may also be factored in to weighted link ratings by the mobile information handling system in determination of optimal wireless links.

Proceeding to 830, the mobile information handling system may have received data on BTS systems in the wireless neighborhood and after determining one or more optimal wireless links that would fit the anticipated wireless service types, may then scan BTS systems for wireless link connectivity. The scan of BTS wireless links may take place in order of link ratings for the BTS systems. In some aspects, the BTS link ratings may have been weighted by cost, energy consumption, and alignment with anticipated wireless link usage according to context aware radio resource management system operation on the mobile information handling system. So for example, lower cost wireless links and BTS system connectivity may be scanned in a first priority over more costly wireless link options.

In accordance with this embodiment, the mobile information handling system conducts a scan after receiving broadcast RF band local QoS reports on one channel. This will minimize a mobile information handling system with pan radio capabilities from having to scan for many BTS systems when entering a wireless neighborhood. The hub BTS system may provide a landscape of BTS systems available in various communication bands and under various protocols as well as load and QoS information before the mobile information handling system scans for BTS connectivity. Only a scan for the broadcast channel for available RF band local QoS reports need be conducted upon entering a wireless neighborhood. Then mobile information handling system scan for BTS connectivity may be limited to optimized wireless link options based on application of the various factors in weighting the link ratings.

Proceeding to 835, the context aware radio resource management system and will select one or more wireless links to establish connectivity in the wireless neighborhood. At 840, the wireless adapter of the mobile information handling system will connect to the corresponding BTS or BTS systems in accordance with the wireless link protocol operating there.

At 845, the mobile information handling system operating within the wireless neighborhood may measure and report details of traffic load on the BTS as well as QoS information back to the hub BTS system operating the RF band local QoS advertisement system 810 to provide additional detail on BTS loading for the selected BTS system. In other aspects, traffic loading and QoS characteristics of the wireless links, including power consumption data in some embodiments, may be reported to the centralized context aware radio resource management system 850 that may be remotely located. The context aware radio resource management system software on the mobile information handling system may record usage, QoS, traffic and other data for the BTS according to time and location and crowdsource that data to a centralized location.

At 855, the mobile information handling system may conduct a scan for possible new BTS systems added to a wireless neighborhood. In particular, this scan for newly added BTS options may be conducted periodically if a mobile information handling system has not changed location for a period of time.

At 860, the results of the scan for new BTS systems in a wireless neighborhood may be reported back to the hub BTS operating the RF band local QoS advertisement system 810. The mobile information handling system may have radio capability in radio frequency communication bands unavailable to the hub BTS system and reporting that information to the RF band local QoS advertisement system 810 may enable it to update the scope of the monitored wireless neighborhood in an example embodiment. At this point the process may end. It is understood however, that as the mobile information handling system moves, the process of FIG. 8 may repeat with determination of a change in location. Location change may be monitored by the context aware radio resource management system operating on the mobile information handling system in an aspect. In another aspect, the context aware radio resource management system at the mobile information handling system may also periodically re-assess BTS load or QoS characteristics which are fluid and may change in the wireless neighborhood without a location change. The re-assessment may be made to determine if a change in selected wireless links is warranted in the wireless neighborhood from time to time. In a re-assessment embodiment, no identified mobile information handling system location change would be necessary to receive an RF band local QoS report for the wireless neighborhood and re-determine selection of a wireless link based thereon.

It is understood that the methods and concepts described in the algorithm above for FIG. 8 may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments.

Figure 9:
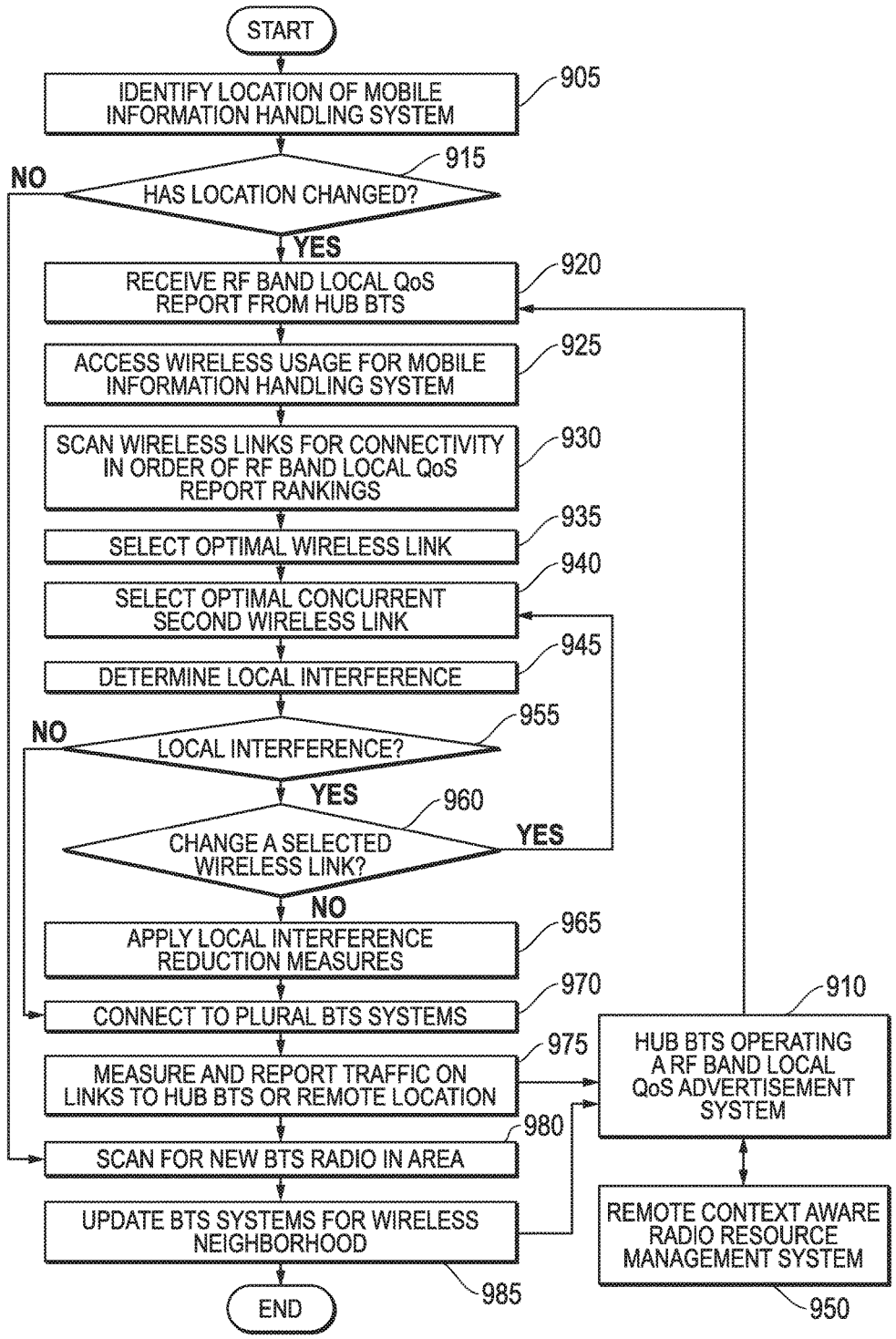
FIG. 9 is a flow diagram illustrating another method of determining a wireless link using a broadcast RF band local QoS report according to an embodiment of the present disclosure.

FIG. 9 illustrates another method of operation of a context aware radio resource management system on a mobile information handling system which utilizes received RF band local QoS reports. The RF band local QoS reports are received from a hub BTS advertising them to a wireless neighborhood according to an embodiment. In this example embodiment, a mobile information handling system entering a wireless neighborhood may have a substantial selection of wireless links available. Some of those wireless links may be competing wireless link protocols operating on shared communication frequency bands. Additionally, a mobile wireless communication device entering a wireless neighborhood may utilize a plurality of wireless links for concurrent data communication as described above. In one example embodiment, a mobile wireless communication device may concurrently select two wireless links on a shared radiofrequency communication band. For example, a mobile wireless communication device may utilize WLAN and an unlicensed small cell WWAN wireless link within the shared, wireless communication band. In another example embodiment, a plurality of LPWAN wireless links operating on the mobile information handling system in separate protocols may utilize a shared, wireless communication band.

A hub BTS may operate an RF band local QoS advertisement system 910 with access to a centralized context aware radio resource management system 950 according to embodiments herein and similar to the embodiment described in FIG. 8. The RF band local QoS advertisement system 910 may provide one or more RF band local QoS reports for BTS systems in the wireless neighborhood. Mobile information handling systems entering and seeking wireless link access to BTS systems in the wireless neighborhood may receive these reports on an unlicensed channel requiring limited or no authorization to access. The RF band local QoS advertisement system 810 at a hub BTS may draw QoS or link rating data from the centralized context aware radio resource management system 850 in accordance with embodiments described herein in generating the RF band local QoS reports.

The method of FIG. 9 may be executed via code instructions for a context aware radio resource management system software agent or other portion of code operating on one or more processors or controllers at a mobile information handling system entering a wireless neighborhood.

Starting at 905, the mobile information handling system may determine its location and record the same for the context aware radio resource management system operating thereon. Identification of location may be established via a plurality of techniques known in the art and described herein. For example, the mobile information handling system may have an on-board GPS available to determine a longitude and latitude readings as understood by those of skill in the art. Other options as described in embodiments herein are also contemplated to establish location.

At 915, if that mobile information handling system location has changed since a previously recorded location, flow will proceed to 920 to determine the QoS and load characteristics of the new wireless neighborhood. Location may be recorded in a periodic fashion or may be recorded after periods of detected motion by the mobile information handling system. If no change in location has been determined at 915, flow may proceed to 980 to scan and determine if any new BTS radio systems have been added to the current wireless neighborhood as described further below.

Upon determination that a location change has occurred at 915 however, the mobile information handling system may determine if an unlicensed broadcast channel is available in for connection with an RF band local QoS advertisement system 910. If an unlicensed broadcast channel is available, it may be made available on a select set of designated broadcast channels. Thus, the mobile information handling system limit scanning to the select designated broadcast advertisement channel option or options. In one example embodiment, a designated wireless broadcast channel, such as a channel reserved under IEEE 802.11 Wi-Fi standards, may be used to broadcast the RF band local QoS reports by the hub BTS system on an unlicensed band. In an example embodiment, an unlicensed band at 2.4 GHz may be used to broadcast the RF band local QoS reports due to good wireless propagation range of that band. An entering mobile information handling system may receive the RF band local QoS reports via the unlicensed broadcast channel entering a required link access routine or submitting authorization to receive the RF band local QoS reports.

Received data from the RF band local QoS advertisement system may be used to reduce computational or scanning burden on the mobile information handling system during selection of one or more BTS systems and respective wireless links among several available options for data communications. The mobile information handling system may listen on the unlicensed broadcast band for the RF band local QoS reports which may be broadcast periodically as described.

In another particular embodiment, the broadcast channel may be a beacon system indicating to mobile information handling systems that RF band local QoS reports are available via unlicensed communication. For example, a generic advertising services (GAS) system such as available in Wi-Fi protocol under 802.11u may be used. A vendor specific option in the GAS beacon indicates that an RF band local QoS report is available. No authorization would be needed to access such a beacon. For example, the GAS beacon may contain one or more tags. In an example embodiment, a custom tag entry may be included such as PAN_Radio_Local_QOS_Report. Under IEEE 802.11u, the system includes APs communicating enhancements for a Wi-Fi network with more information to wireless network participating devices pursuant to probe responses seeking additional data. This provides for an ability of client devices such as mobile information handling systems in a wireless neighborhood to request additional information on the RF band local QoS reports without saturating generic advertising services for enhancements that may not be consistently used. Upon receiving notice of the available RF band local QoS reports, the mobile information handling system transmits a probe request seeking the RF band local QoS local report for conditions in the wireless neighborhood. Other variations on broadcasting the RF band local QoS reports to mobile information handling systems in a wireless neighborhood are contemplated as well including via use of LPWAN links or ISM protocols.

The mobile information handling system receives the RF band local QoS reports from a hub BTS system 910 pursuant to embodiments herein. As described, the RF band local QoS reports will have been generated by the RF band local QoS advertisement system providing local scanned data identifying a plurality of BTS systems within a wireless neighborhood that are within range of a wireless adapter of the hub BTS system 910. The RF band local QoS reports may include identifying information and scanned load levels for BTS systems in the wireless neighborhood. The hub BTS 910 or auxiliary hub BTS systems may gather load information for neighborhood BTS systems in different bands as described.

In one embodiment, assessing activity on the channel by the neighborhood BTS systems over a period of time may provide a reading of BTS load occupancy for each BTS system operating on a wireless link in the channel. This may be conducted by the hub BTS system or auxiliary hub BTS systems. To conduct a measure of BTS load occupancy, the RF band local QoS advertisement system scanning function will listen to a channel over the period of time. The RF band local QoS advertisement system will record a percentage of time the channel is above the energy detected (ED) level during that listening period. The ED level can be set to a static value in some embodiments such as −62 dBm or set dynamically based on statistics for radio interference levels. In any event, the ED level is set to be above a noise floor level of the BTS system to detect activity on the channel. In an aspect, the RF band local QoS advertisement system may also determine which identified BTS systems are operating during the listening period to associate the load determinations with the neighborhood BTS systems. In such an embodiment, a local load may be established for BTS systems in the wireless neighborhood by the RF band local QoS advertisement system.

In another embodiment, some wireless protocols provide for a reporting system to make available active load reading for BTS systems operating within the wireless link protocol. For example, Wi-Fi systems in a WLAN may report BSS load under 802.11. This BSS load data may be accessed from a central data base or from the BTS system itself in various embodiments. In yet another embodiment, load reporting may be received by a context aware radio resource management system crowd sourced in accordance with embodiments herein. BTS load may be accessed by the RF band local QoS advertisement system from one or more sources such as those described above. Providing this data via broadcast RF band local QoS reports will reduce the computational time and scanning time necessary by the mobile information handling system entering a wireless neighborhood to identify available wireless links for assessment.

Further, as described in some embodiments, the hub BTS operating an RF band local QoS advertisement system 910 may access to a centralized context aware radio resource management system 950 for QoS data and link ratings. QoS data and link rating data may be included or blended into the RF band local QoS reports for the plurality of BTS systems in the wireless neighborhood. Broadcast of the link ratings and QoS data permits the mobile information handling system to avoid accessing the context aware radio resource management system separately for this information while obtaining up-to-date local information on data load characteristics of neighborhood BTS systems. The RF band local QoS reports received at 920 may also include BTS rankings in accordance with embodiments herein. In other embodiments, the received RF band local QoS reports at 920 may include recommended wireless links for certain protocols in the wireless neighborhood.

As described previously, the mobile information handling system may take the RF band local QoS reports and select one or more optimal wireless links based on rankings or BTS load and QoS information contained therein. In other embodiments, the mobile information handling system may take the RF band local QoS reports as a baseline and add other factors into determining selection of an optimal wireless link or wireless links.

In one example embodiment, flow may proceed to 925. The mobile information handling system may utilize the context aware radio resource management system operating locally to apply additional factors to the link ratings or QoS data received with the RF band local QoS reports. At 925, the context aware radio resource management system on the mobile information handling system will access its user profile data. Assessment of historical records of wireless service usage by the mobile information handling system for certain times or locations may yield a predominant usage or set of usages of wireless services. In some aspects, cyclostationary usage data may be accessed in accordance with the several embodiments. The context aware radio resource management system may determine one or more anticipated wireless service usage types based on the historically predominate services used. The anticipated wireless service type or types may then be aligned with the RF band local QoS report data link ratings that include corresponding wireless service usage categories. In one embodiment, the highest rated wireless link or links for the anticipated wireless service may be selected. These wireless links may then be weighted with a higher ranking in an aspect of the present embodiment if the up to date scanned BTS load is below a certain threshold level.

Assessment of anticipated wireless service usage at 925 will yield a list of one or more optimal wireless links ranked by weighted link ratings. In some embodiments, cost or energy consumption may factor into the weighting of list of optimal wireless links and BTS systems within the neighborhood in addition to the above or instead of the anticipated usage determinations. User preferences may also be factored in to weighted link ratings by the mobile information handling system in determination of optimal wireless links as described in embodiments herein.

Proceeding to 930, the mobile information handling system scans the BTS systems on the ranked list of optimal wireless links to determine availability for connection. The scan of BTS wireless links may take place in order of link ratings for the BTS systems. In some aspects, priority of selection of the wireless links may be applied to the BTS link ratings. For example, lower cost wireless links and BTS systems in unlicensed channels may be scanned in a first priority over more costly wireless link options. In another example embodiment, if battery power level is low, low power consuming wireless links may be scanned for connectivity first.

Scanning the BTS systems according to link rankings or limiting the scan to only listed optimal wireless links will minimize a mobile information handling system with pan radio capabilities from having to scan for a large plurality of BTS systems when entering a wireless neighborhood. The hub BTS system provides a landscape of BTS systems available and load and QoS conditions in the wireless neighborhood via the RF band local QoS reports. This reduces the mobile information handling system scan for BTS connectivity saving power and processing. It further may improve responsiveness of the system in determining optimized wireless links via the context aware radio resource management system.

Proceeding to 935, the context aware radio resource management system and will select one wireless link to establish connectivity in the wireless neighborhood. At 940, the context aware radio resource management system and will select second wireless link to establish potential concurrent link connectivity in the wireless neighborhood. Due to the risk of competing wireless links operating in a shared frequency communication band, flow proceeds to 945. At 945, the concurrent wireless link optimization system will determine if the selected wireless links may raise a substantial risk of local interference at the mobile information handling system. If, for example, a WLAN AP is selected as a first wireless link and a small cell WWAN base station is selected for a second wireless link and these BTS systems operate on a shared radio frequency communication band, risk of local interference is assessed at 945. A channel determination for each of the selected, concurrent wireless links is made from the RF band local QoS reports. If the first BTS operates on the same or an adjacent channel to the second BTS selected, this may indicate potential local interference at the mobile information handling system. In the present embodiment however, if a risk of local interference exists at 955, then flow proceeds to 960 to determine whether one of the wireless links should be changed for concurrent wireless link operation. If no risk of local interference is determined at 955, flow proceeds to 970 to connect the concurrent wireless links to the selected BTS systems.

If other wireless links are of insufficient QoS levels, are congested with traffic load, or are not desirable for other reasons such as cost or power consumption, the context aware radio resource management system may not elect to change one or the other concurrent wireless links at 960. In such a case, flow may proceed to 965 to apply local interference mitigation measures. If a change in one of the selected concurrent wireless links is permitted at 960, flow returns to 940 to select a different second wireless links from the list of optimal wireless links determined based on the RF band local QoS reports as modified by the mobile information handling system. It is also contemplated that the flow may return instead to 935 to replace the first selected wireless link instead. Then the process may proceed through step 945 to determine if the replacement wireless link would create a risk of local interference when used concurrently.

If no replacement wireless link is to be selected at 960, then at 965 in embodiments as described herein, interference mitigation measures may be implemented. Example embodiments include data scheduling implemented to mitigate the local interference risk by avoiding simultaneous transmission of data on a same channel or adjacent channels. Another example embodiment includes an adaptive bandpass filtering system to more sharply define adjacent channels and reducing bleed over interference at a concurrently operating wireless adapter that may occur with standard channel range determination.

At 970, the wireless adapter of the mobile information handling system will connect to the corresponding BTS systems in accordance with the wireless link protocols operating on those systems for concurrent wireless communication. Concurrent wireless communication provides added bandwidth and connectivity for the mobile information handling system. It is understood that mobile information handling system connection to the selected BTS systems would be in accordance with the wireless protocols supported at those BTS systems.

At 975, the mobile information handling system operating within the wireless neighborhood may measure and report details of traffic load on the BTS as well as QoS information back to the hub BTS system operating the RF band local QoS advertisement system 910 to provide additional detail on BTS loading for the selected BTS system. In other aspects, traffic loading and QoS characteristics of the wireless links, including power consumption data in some embodiments, may be reported to the centralized context aware radio resource management system 950 that may be remotely located. The context aware radio resource management system software on the mobile information handling system may record usage, QoS, traffic and other data for the BTS according to time and location and crowd-source that data to a centralized location.

Proceeding to 980, the mobile information handling system may conduct a scan for possible new BTS systems in the wireless neighborhood. In particular, this scan for newly added BTS options may be conducted periodically to keep abreast of changes in the wireless neighborhood. At 985, the results of the scan for new BTS systems in a wireless neighborhood may be reported back to the hub BTS operating the RF band local QoS advertisement system 910. The mobile information handling system reporting to the RF band local QoS advertisement system 910 may enable it to update the scope of the monitored wireless neighborhood and BTS systems in the wireless neighborhood in an example embodiment. At this point the process may end.

In some embodiments, the context aware radio resource management system may determine whether periodic re-assessments of the wireless neighborhood are to be made. Due to the fluid nature of the QoS and load conditions in a wireless neighborhood, periodic re-assessment may be desirable to determine if selected wireless links are still optimal. In such an example embodiment after a period of time operating in a wireless neighborhood, a mobile information handling system may re-check the RF band local QoS reports that may have changed for BTS load or QoS characteristics in the wireless neighborhood. In an embodiment, the context aware radio resource management system at the mobile information handling system will periodically re-assess to account for the fluidity of the BTS traffic loading to changing QoS characteristics. The re-assessment may be made to determine if a change in selected wireless links is warranted in the wireless neighborhood from time to time. If the current wireless links increase in BTS loading above a threshold percentage or if the QoS ratings drop by a threshold percentage, then the context aware radio resource management system may send the flow back to 920 in such an embodiment to receive a more current RF band local QoS report from the hub BTS system. Then the process of FIG. 9 may repeat to re-select one or more optimal wireless link in accordance with the more current RF band local QoS report data. As with the above process, preference weighting for usage, cost, power consumptions and other factors may be applied at the mobile information handling system to determine optimal wireless links as set forth in the process embodiments herein.

It is further understood that as the mobile information handling system moves, the process of FIG. 9 may repeat with determination of a change in location at 905 for a new wireless neighborhood. Location change may be monitored by the context aware radio resource management system operating on the mobile information handling system in an aspect of the present disclosure. This location monitoring may be ongoing.

It is understood that the methods and concepts described in the algorithm above for FIG. 9 may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments. For example, aspects of the various embodiments of several figures herein may be modified as understood by those of skill to implement variations described from each of those embodiments to the methods of FIG. 8 or FIG. 9.

In some embodiments, dedicated hardware implementations such as application specific integrated circuits, programmable logic arrays and other hardware devices can be constructed to implement one or more of the methods described herein or portions of one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a wireless interface for communicating via one or more wireless links at a location in a wireless neighborhood;
    the wireless interface listening to a designated radiofrequency band QoS local advertisement channel upon entering a wireless neighborhood for advertised RF band local QoS reports for the wireless neighborhood;
    the wireless interface receiving a broadcast RF band local QoS report from a hub base transceiver station (BTS) including ratings of BTSs in the wireless neighborhood, wherein the RF band local QoS report includes at least a BTS identifier, a BTS operating radio channel, and a BTS radiofrequency traffic load, wherein the hub BTS is designated for broadcasting advertised RF band local QoS reports to information handling systems entering the wireless neighborhood; and
    an application processor determining available wireless protocols and selecting a wireless protocol and a BTS operating channel for at least one neighborhood BTS based in part on the RF band local QoS report,
    wherein the RF band local QoS report is received on an unlicensed broadcast radio frequency channel broadcast by the hub BTS on the designated radiofrequency band QoS local advertisement channel to the wireless neighborhood.

2. The system of claim 1, wherein the unlicensed broadcast radio frequency channel is in a 2.4 MHz communication band.

3. The system of claim 1, wherein the received RF band local QoS report includes a link rating derived from a context aware radio resource management system and a BTS radiofrequency traffic load for the at least one neighborhood BTS.

4. The system of claim 1, wherein the received RF band local QoS report includes a link rating for the at least one neighborhood BTS according to a plurality of wireless service usage categories.

5. The system of claim 1 further comprising:
the wireless adapter receives notice of an available RF band local QoS report on the unlicensed broadcast radio frequency channel that is a generic advertising services channel; and
the processor transmits a probe in response to the notice on the unlicensed generic advertising services channel requesting the RF band local QoS report.

6. The system of claim 1, wherein the received RF band local QoS report includes a ranked plurality of the BTS systems in the wireless neighborhood.

7. The system of claim 1, wherein the received RF band local QoS report includes a recommended BTS based on QoS factors for each detected BTS system available in the wireless neighborhood.

8. The system of claim 1 further comprising:
the application processor selecting a second wireless protocol and a second BTS operating channel for a second neighborhood BTS for concurrent wireless link operation based further on determination of a low risk of local interference.

9. A computer implemented method comprising:
listening, via a wireless interface of a mobile information handling system, to a designated radiofrequency band QoS local advertisement channel upon entering a wireless neighborhood for advertised RF band local QoS reports for the wireless neighborhood;
receiving, via the wireless interface of the mobile information handling system, a broadcast RF band local QoS report from a hub base transceiver station (BTS) on the designated radiofrequency band QoS local advertisement channel in an RF band different from a plurality of communication wireless links assessed in the RF band local QoS report, the RF band local QoS report including ratings of a plurality of BTSs in a wireless neighborhood, wherein the RF band local QoS report includes at least a link rating for one or more BTSs in the wireless neighborhood determined from a context aware radio resource management system and a BTS radiofrequency traffic load for the at least one neighborhood BTS; and
determining, via an application processor, available wireless protocols and selecting a wireless protocol and a BTS operating channel for at least one neighborhood BTS based in part on the RF band local QoS report, wherein the RF band local QoS report is received on an unlicensed broadcast radio frequency channel broadcast by the hub BTS on the designated radiofrequency band QoS local advertisement channel to the wireless neighborhood.

10. The method of claim 9 further comprising:
selecting a second wireless protocol and a second BTS operating channel for a second neighborhood BTS for concurrent wireless link operation based further on determination of a low risk of local interference.

11. The method of claim 9 further comprising:
the application processor re-determining the link rating for the at least one neighborhood BTS based on a battery power level of the mobile information handling system.

12. The method of claim 9 further comprising:
receiving, via the wireless adapter, a notice of the RF band local QoS report on the unlicensed broadcast radio frequency channel that is a generic advertising services channel; and
transmitting a probe in response to the notice on the unlicensed generic advertising services channel requesting to receive the RF band local QoS report, wherein the unlicensed broadcast radio frequency channel is the generic advertising services channel.

13. The method of claim 9, wherein the received RF band local QoS report includes a ranked plurality of the BTS systems in the wireless neighborhood.

14. The method of claim 9, wherein the wireless neighborhood includes BTSs with a first wireless link protocol that is a WLAN protocol and a second wireless link protocols is an unlicensed small cell WWAN protocol.

15. An information handling system comprising:
a wireless interface for communicating via one or more wireless links at a location in a wireless neighborhood;
the wireless interface listening to a designated radiofrequency band QoS local advertisement channel upon entering a wireless neighborhood for advertised RF band local QoS reports for the wireless neighborhood;
the wireless interface receiving a broadcast RF band local QoS report from a hub base transceiver station (BTS) on the designated radiofrequency band QoS local advertisement channel, the RF band local QoS report including ratings of BTSs in the wireless neighborhood, wherein the RF band local QoS report includes at least a BTS identifier, a BTS operating radio channel, and a BTS radiofrequency traffic load;
the application processor accessing user profiles reflecting wireless service usage history to determine an anticipated wireless service usage; and
the application processor determining available wireless protocols and selecting a wireless protocol and a BTS operating channel for at least one neighborhood BTS based on link ratings for the anticipated wireless service usage in the RF band local QoS report,
wherein the RF band local QoS report is received on an unlicensed broadcast radio frequency channel broadcast by the hub BTS on the designated radiofrequency band QoS local advertisement channel to the wireless neighborhood.

16. The system of claim 15, wherein the received RF band local QoS report includes a link rating determined from a context aware radio resource management system QoS data and a BTS radiofrequency traffic load for the at least one neighborhood BTS.

17. The system of claim 16 further comprising:
the application processor re-determining the link rating for the at least one neighborhood BTS based on a battery power level of the information handling system.

18. The system of claim 15 further comprising:
the wireless adapter receives notice of an available RF band local QoS report on the unlicensed broadcast radio frequency channel that is a generic advertising services channel; and
the processor transmits a probe in response to the notice on the unlicensed generic advertising services channel requesting the RF band local QoS report.

19. The system of claim 15, wherein the received RF band local QoS report includes a ranked plurality of the BTS systems in the wireless neighborhood.

20. The system of claim 15 further comprising:
the application processor selecting a second wireless protocol and a second BTS operating channel for a second neighborhood BTS for concurrent wireless link operation based further on determination of a low risk of local interference.

* * * * *